(12) United States Patent
Yasuda et al.

(10) Patent No.: US 7,409,827 B2
(45) Date of Patent: Aug. 12, 2008

(54) WORKING VEHICLE

(75) Inventors: Toshifumi Yasuda, Hyogo (JP); Koji Kiyooka, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 188 days.

(21) Appl. No.: 11/498,093

(22) Filed: Aug. 3, 2006

(65) Prior Publication Data

US 2007/0028610 A1    Feb. 8, 2007

(30) Foreign Application Priority Data

Aug. 5, 2005    (JP) .............................. 2005-228552

(51) Int. Cl.
*B60K 17/10* (2006.01)
*B60K 25/06* (2006.01)
*B60K 17/28* (2006.01)
*F15B 21/04* (2006.01)
*A01D 34/64* (2006.01)

(52) U.S. Cl. ......................................... 60/456; 60/329
(58) Field of Classification Search .................. 60/329, 60/456, 488
See application file for complete search history.

(56) References Cited

U.S. PATENT DOCUMENTS

| | | | | |
|---|---|---|---|---|
| 2,961,829 A | * | 11/1960 | Weisenbach | 60/456 |
| 3,823,558 A | * | 7/1974 | Tittmann et al. | 60/456 |
| 3,932,992 A | * | 1/1976 | Martin | 60/456 |
| 5,927,073 A | * | 7/1999 | Ishizaki et al. | 60/488 |
| 6,397,593 B1 | * | 6/2002 | Duckinghaus | 60/456 |
| 6,457,546 B1 | * | 10/2002 | Ishimaru et al. | 60/488 |
| 7,269,946 B2 | * | 9/2007 | Umemura et al. | 60/456 |
| 7,299,629 B2 | * | 11/2007 | Betz et al. | 60/488 |

FOREIGN PATENT DOCUMENTS

JP        2003-291674      10/2003

* cited by examiner

*Primary Examiner*—Thomas E Lazo
(74) *Attorney, Agent, or Firm*—Sterne, Kessler, Goldstein & Fox P.L.L.C.

(57) ABSTRACT

There is provided a working vehicle including: a hydraulic pump unit including a hydraulic pump main body operatively driven by a driving power source, and a pump case accommodating the hydraulic pump main body and having an inner space capable of storing oil; a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil; an auxiliary pump unit including an auxiliary pump main body operatively driven by the driving power source; a circulation line for fluidly connecting the auxiliary pump main body, the pump case and the motor case so that at least a part of oil, which has been discharged from the auxiliary pump main body, returns to a suction side of the auxiliary pump main body through the inner spaces of the pump case and the motor case; and an oil cooler interposed in the circulation line so as to be positioned. between the auxiliary pump main body and the pump case or the motor case.

15 Claims, 12 Drawing Sheets

WORKING VEHICLE

BACKGROUND OF THE INVENTION

1. Field of the Invention

The present invention relates to a working vehicle including a hydraulic pump unit operatively driven by a driving source, and a hydraulic motor unit spaced apart from the hydraulic pump unit, the hydraulic pump unit and the hydraulic motor unit being fluidly connected to each other so as to form a traveling system HST.

2. Background Art

The working vehicle including a hydraulic pump unit operatively and rotatably driven by a driving power source, and a hydraulic motor unit spaced apart from the hydraulic pump unit so as to be arranged in proximity to a corresponding driving wheel, and configured to drive the driving wheel with variable speeds by means of a traveling system HST formed by the hydraulic pump main body of the hydraulic pump unit and the hydraulic motor main body of the hydraulic motor unit is conventionally known (see e.g., Japanese Laid-Open Patent Publication No. 2003-291674).

The thus configured working vehicle includes a working vehicle of a wheel motor type in which the hydraulic motor unit is provided for each driving wheel, a working vehicle of a mechanical differential type in which an output of the hydraulic motor unit is differentially transmitted to a pair of right and left driving wheels via a mechanical differential gear device, and a working vehicle of a hydraulic differential type in which a pair of hydraulic motor main bodies corresponding to the pair of right and left driving wheels are fluidly connected to each other via a pair of motor-side operation fluid lines and a hydraulic pump main body is fluidly connected to the pair of motor-side operation lines via a pair of operation fluid lines.

The working vehicle could enhance the degree of freedom in design in comparison with the working vehicle in which the hydraulic pump unit and the hydraulic motor unit are integrated to each other, since the hydraulic motor unit is arranged in proximity to the corresponding driving wheel while being spaced apart from the cooperating hydraulic pump unit.

However, cooling of the hydraulic motor unit is not sufficiently taken into consideration in the conventional working vehicle in which the hydraulic pump unit and the hydraulic motor unit are disposed away from each other.

That is, the hydraulic motor main body is rotatably driven by the hydraulic fluid pressure from the hydraulic pump main body. In this operation, the temperature of the hydraulic pump main body and the hydraulic motor main body rises due to the influence of friction and the like.

The rise in temperature of the hydraulic motor main body causes rise in temperature and the like of the HST hydraulic fluid, resulting in worsening the transmission efficiency of the HST.

Similarly, cooling of the hydraulic pump unit is not sufficiently taken into consideration in the conventional working vehicle.

The rise in temperature of the hydraulic pump main body also causes rise in temperature and the like of the HST hydraulic fluid, resulting in worsening the transmission efficiency of the HST.

In view of the conventional art, it is an object of the present invention to provide a working vehicle including a hydraulic pump unit operatively and rotatably driven by the driving power source and a hydraulic motor unit spaced apart from the hydraulic pump unit, where the cooling efficiency of the hydraulic motor unit could be enhanced.

Another object of the present invention is to also enhance the cooling efficiency of the hydraulic pump unit in the working vehicle of the above type.

Still another object of the present invention is to provide a working vehicle including a hydraulic pump unit operatively and rotatably driven by the driving power source, and a hydraulic motor unit spaced apart from the hydraulic pump unit, the hydraulic pump unit including a PTO clutch mechanism operatively and rotatably driven by the driving power source, where the cooling efficiency of the hydraulic motor unit and the PTO clutch mechanism could be enhanced.

BRIEF SUMMARY OF THE INVENTION

According to the present invention, there is provided a working vehicle including: a hydraulic pump unit including a hydraulic pump main body operatively driven by a driving power source, and a pump case accommodating the hydraulic pump main body and having an inner space capable of storing oil; a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil; an auxiliary pump unit including an auxiliary pump main body operatively driven by the driving power source; a circulation line for fluidly connecting the auxiliary pump main body, the pump case and the motor case so that at least a part of oil, which has been discharged from the auxiliary pump main body, returns to a suction side of the auxiliary pump main body through the inner spaces of the pump case and the motor case; and an oil cooler interposed in the circulation line so as to be positioned. between the auxiliary pump main body and the pump case or the motor case.

According to the configuration, the rise in temperature of the hydraulic pump main body accommodated in the pump case and the hydraulic motor main body accommodated in the motor case are effectively prevented. Therefore, the transmission efficiency of the HST formed by the hydraulic pump main body and the hydraulic motor main body is prevented from degrading.

Preferably, the working vehicle may further include an external reservoir tank forming an oil source for the auxiliary pump unit. In such case, the circulation line may include a suction line for fluidly connecting the external reservoir tank and the suction side of the auxiliary pump main body, a discharge line for fluidly connecting a discharge side of the auxiliary pump main body and the oil cooler, and a return line for returning the oil, which has been cooled by the oil cooler, to the external reservoir tank through the inner spaces of the pump case and the motor case.

For example, the return line is configured so as to fluidly connect the pump case and the motor case in series.

Alternatively, the return line is configured so as to fluidly connect the pump case and the motor case in parallel.

The present invention further provides a working vehicle including: a hydraulic pump unit including first and second hydraulic pump main bodies operatively driven by a driving power source, and a pump housing accommodating the first and second hydraulic pump main bodies and having an inner space capable of storing oil; a first hydraulic motor unit spaced apart from the hydraulic pump unit so as to operatively drive a first driving wheel out of a pair of first and second driving wheels, the first hydraulic motor unit including a first hydraulic motor main body fluidly connected to the first hydraulic pump main body so as to form an HST in cooperation with the first hydraulic pump main body, and a first motor case accommodating the first hydraulic motor main body and having an inner space capable of storing oil; a second hydraulic motor unit spaced apart from the hydraulic pump unit so as to operatively drive the second driving wheel, the second hydraulic motor unit including a second hydraulic motor main body fluidly connected to the second hydraulic pump main body so as to form an HST in cooperation with the second hydraulic pump main body, and a second motor case accommodating the second hydraulic motor main body and having an inner space capable of storing oil; an auxiliary pump unit including an auxiliary pump main body operatively driven by the driving power source; an external reservoir tank forming an oil source for the auxiliary pump unit; a circulation line for fluidly connecting the external reservoir tank, the auxiliary pump main body, the pump housing and the motor case so that at least a part of oil, which has been suctioned by and discharged from the auxiliary pump main body, returns to the external reservoir tank through the inner spaces of the pump housing and the motor case; and an oil cooler interposed in the circulation line so as to be positioned between the auxiliary pump main body and the pump housing or the motor case.

According to the configuration, the rise in temperature of the first and second hydraulic pump main bodies accommodated in the pump housing, as well as the first and second hydraulic motor main bodies respectively accommodated in the first and second motor cases are effectively prevented. Therefore, the transmission efficiencies of the first HST formed by the first hydraulic pump main body and the first hydraulic motor main body, and the second HST formed by the second hydraulic pump main body and the second hydraulic motor main body are prevented from degrading.

Preferably, the pump housing includes a base housing having a single input portion operatively connected to the driving power source, output portions capable of outputting the rotational power of the input portion towards the first and second hydraulic motor main bodies, and an inner space capable of storing oil; and a pump case connected to the base housing, the pump case accommodating the first and second hydraulic pump main bodies and having an inner space of storing oil. The base housing and the pump case are configured to be fluidly communicated to each other. The pump case is provided with an oil-introducing port for receiving the oil directly or indirectly supplied from the auxiliary pump main body. The base housing is provided with an oil-discharging port for discharging the stored oil.

For example, the pump case includes first and second pump cases accommodating the first and second hydraulic pump main bodies, respectively.

In one embodiment, vehicle may further include a PTO clutch mechanism accommodated within the base housing in a state of being operatively connected to the driving power source; and a PTO shaft operatively connected to a driven side of the PTO clutch mechanism and supported by the base housing so as to have a first end extending outward.

In the one embodiment, the oil-discharging port is preferably arranged so as to overlap at least one part of the PTO clutch mechanism in front view, in a state where the base housing is mounted.

More preferably, the oil-discharging port is arranged below the PTO shaft, in a state where the base housing is mounted.

The present invention still further provides a working vehicle including: a hydraulic pump unit having a hydraulic pump main body operatively driven by a driving power source, and a pump case accommodating the hydraulic pump main body and having an inner space capable of storing oil; a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil; an auxiliary pump unit including an auxiliary pump main body operatively driven by the driving power source; a circulation line for fluidly connecting the auxiliary pump main body and the motor case so that at least a part of oil, which has been discharged from the auxiliary pump main body, returns to a suction side of the auxiliary pump main body through the inner space of the pump case; and an oil cooler interposed in the circulation line so as to be positioned between the auxiliary pump main body and the motor case.

According to the configuration, the rise in temperature of the hydraulic motor main body accommodated in the motor case is effectively prevented. Therefore, the transmission efficiency of the HST formed by the hydraulic pump main body and the hydraulic motor main body is prevented from degrading.

The present invention still further provides a working vehicle including: a hydraulic pump unit having a hydraulic pump main body operatively driven by a driving power source, and a pump housing that has a pump case accommodating the hydraulic pump main body and a base housing connected to the pump case, the base housing accommodating a PTO clutch mechanism, which is operatively driven by the driving source, within an inner space capable of storing oil, and supporting a PTO shaft, which is operatively connected to a driven side of the PTO clutch mechanism, so as to have a first end extending outward; a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil; an auxiliary pump unit including an auxiliary pump main body operatively driven by the driving power source; a circulation line for fluidly connecting the auxiliary pump main body, the base housing and the motor case so that at least a part of oil, which has been discharged from the auxiliary pump main body, returns to a suction side of the auxiliary pump main body through the inner spaces of the base housing and the motor case; and an oil cooler interposed in the circulation line so as to be positioned between the auxiliary pump main body and the base housing or the motor case.

According to the configuration, the rise in temperature of the hydraulic motor main body accommodated in the motor case is effectively prevented, thereby preventing transmission efficiency of the HST formed by the hydraulic pump main body and the hydraulic motor main body from degrading, as well as the rise in temperature of the PTO clutch mechanism is effectively prevented.

The present invention still further provides a working vehicle including: a hydraulic pump unit having a hydraulic pump main body operatively driven by a driving power source, and a pump housing accommodating the hydraulic pump main body and having an inner space capable of storing oil; a first hydraulic motor unit spaced apart from the hydraulic pump unit and disposed at one side of the vehicle foreand-aft direction so as to operatively drive a corresponding driving wheel, the first hydraulic motor unit including at least a first hydraulic motor main body fluidly connected to the hydraulic pump main body so as to form an HST in cooperation with the hydraulic pump main body, and at least a first motor case accommodating the first hydraulic motor main body and having an inner space capable of storing oil; a second hydraulic motor unit spaced apart from the hydraulic pump unit and disposed at the other side of the vehicle fore-and-aft direction so as to operatively drive a corresponding driving wheel, the second hydraulic motor unit including at least a second hydraulic motor main body fluidly connected to the hydraulic pump main body so as to form an HST in cooperation with the hydraulic pump main body, and at least a second motor case accommodating the second hydraulic motor main body and having an inner space capable of storing oil; an auxiliary pump unit including an auxiliary pump main body operatively driven by the driving power source; a circulation line for fluidly connecting the auxiliary pump main body, the pump case and the first and second motor cases so that at least a part of oil, which has been discharged from the auxiliary pump main body, returns to a suction side of the auxiliary pump main body through the inner spaces of the pump case and the first and second motor cases; and an oil cooler interposed in the circulation line so as to be positioned at a discharge side of the auxiliary pump main body.

According to the configuration, the rise in temperature of the hydraulic pump main body accommodated in the pump case as well as the first and second hydraulic motor main bodies respectively accommodated in the first and second motor cases are effectively prevented. Therefore, the transmission efficiency of the HST formed by the hydraulic pump main body and the first and second hydraulic motor main bodies is prevented from degrading.

In the above various configurations, the working vehicle preferably further includes: a bypass line having one end fluidly connected to the circulation line, and a bypass valve for selectively communicating or shutting off the bypass line.

According to the configuration, it is effectively prevented that the pressure of the circulation line becomes excessively high. Therefore, the oil cooler, sealing members, conduits and the like interposed in the circulation line are effectively prevented from being damaged.

More preferably, the bypass valve is a relief valve for setting a maximum pressure of the circulation line.

According to the configuration, it is automatically prevented that the pressure of the circulation line becomes higher than the pressure set by the relief valve.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

Embodiment 1

A preferred embodiment of the working vehicle according to the present invention will now be described with reference to the attached drawings.

Figure 1:
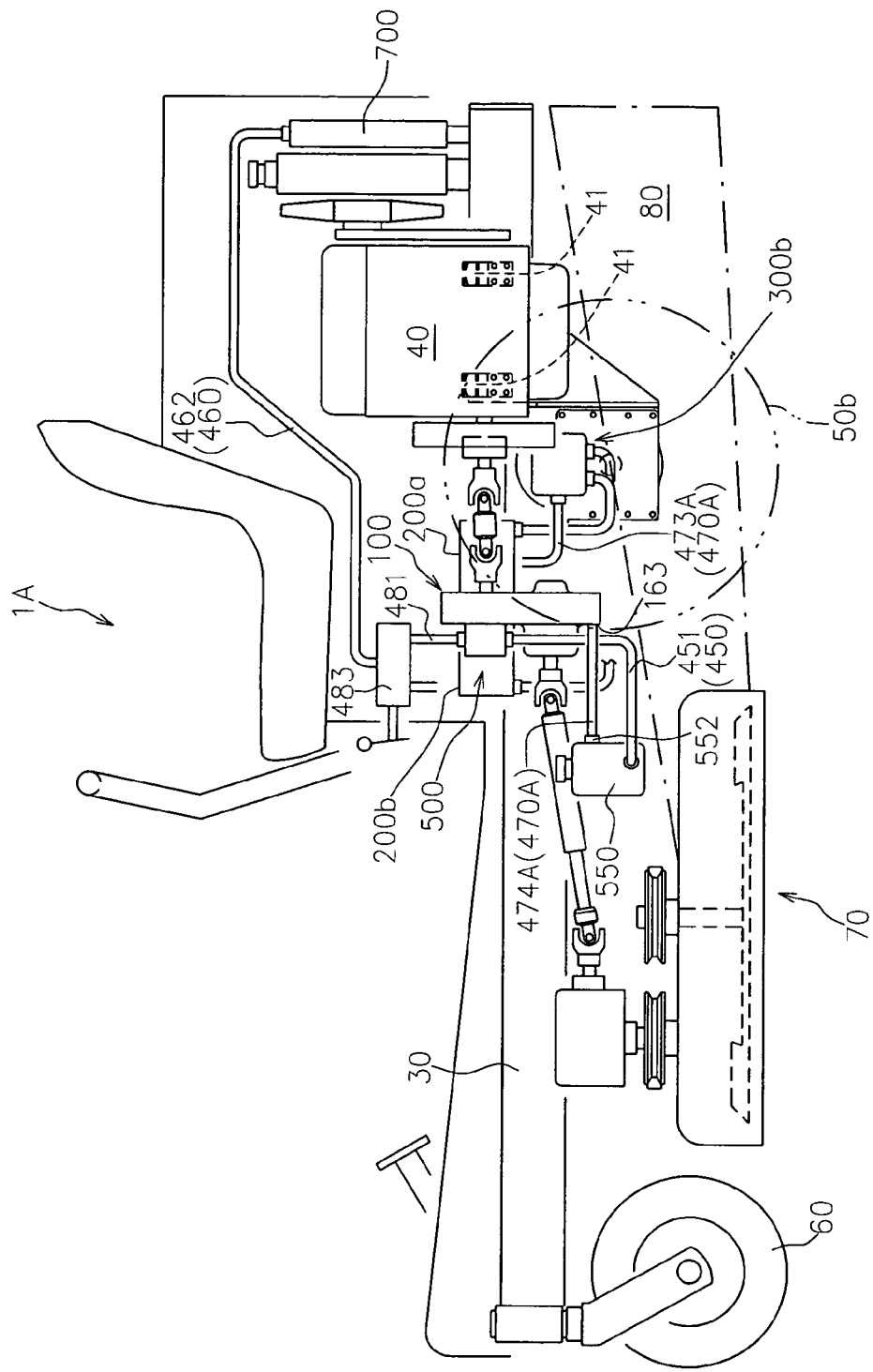
FIG. 1 is a side view of a working vehicle according to a first embodiment of the present invention.
Figure 2:
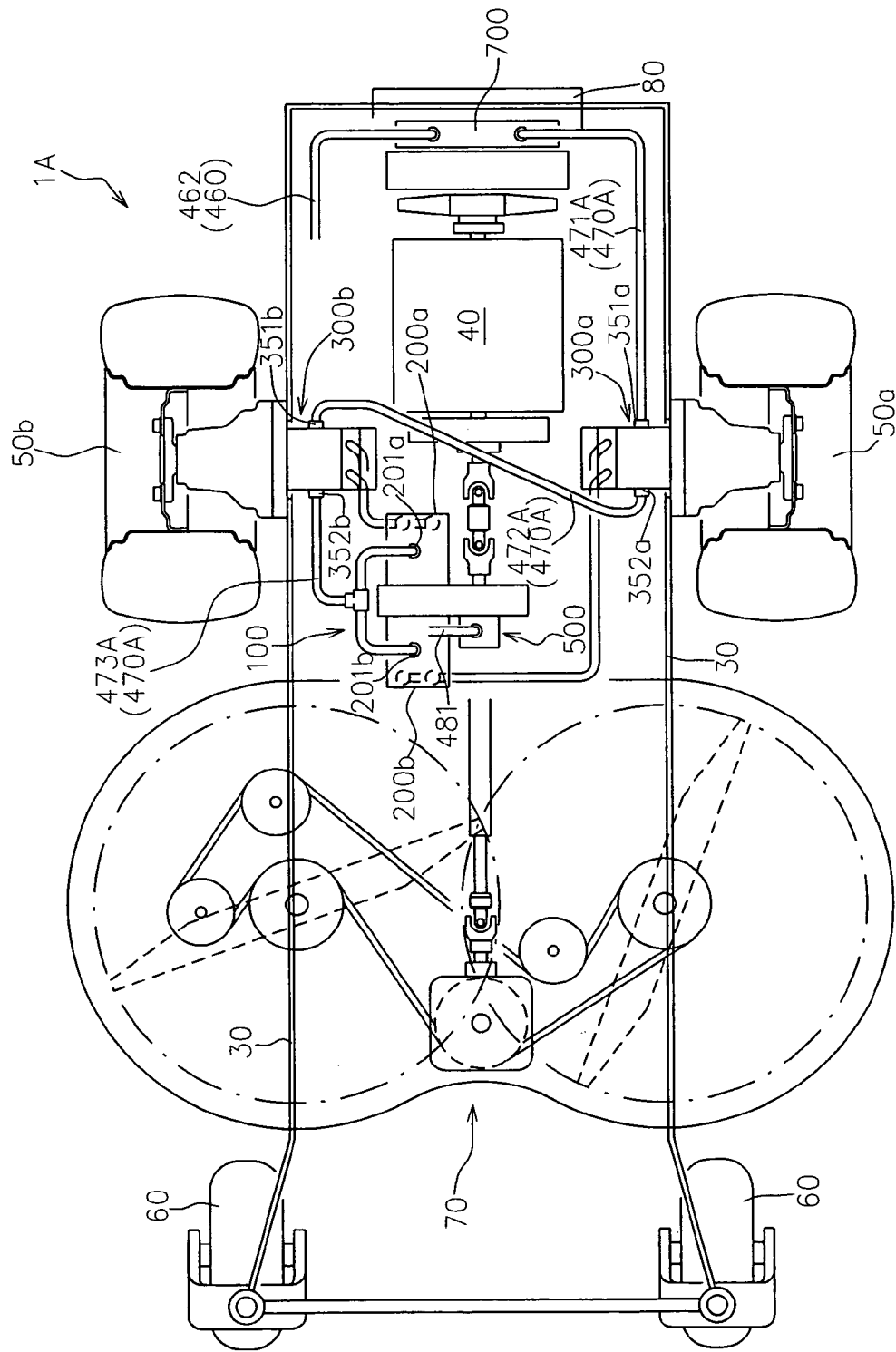
FIG. 2 is a plan view of the working vehicle according to the first embodiment.
Figure 3:
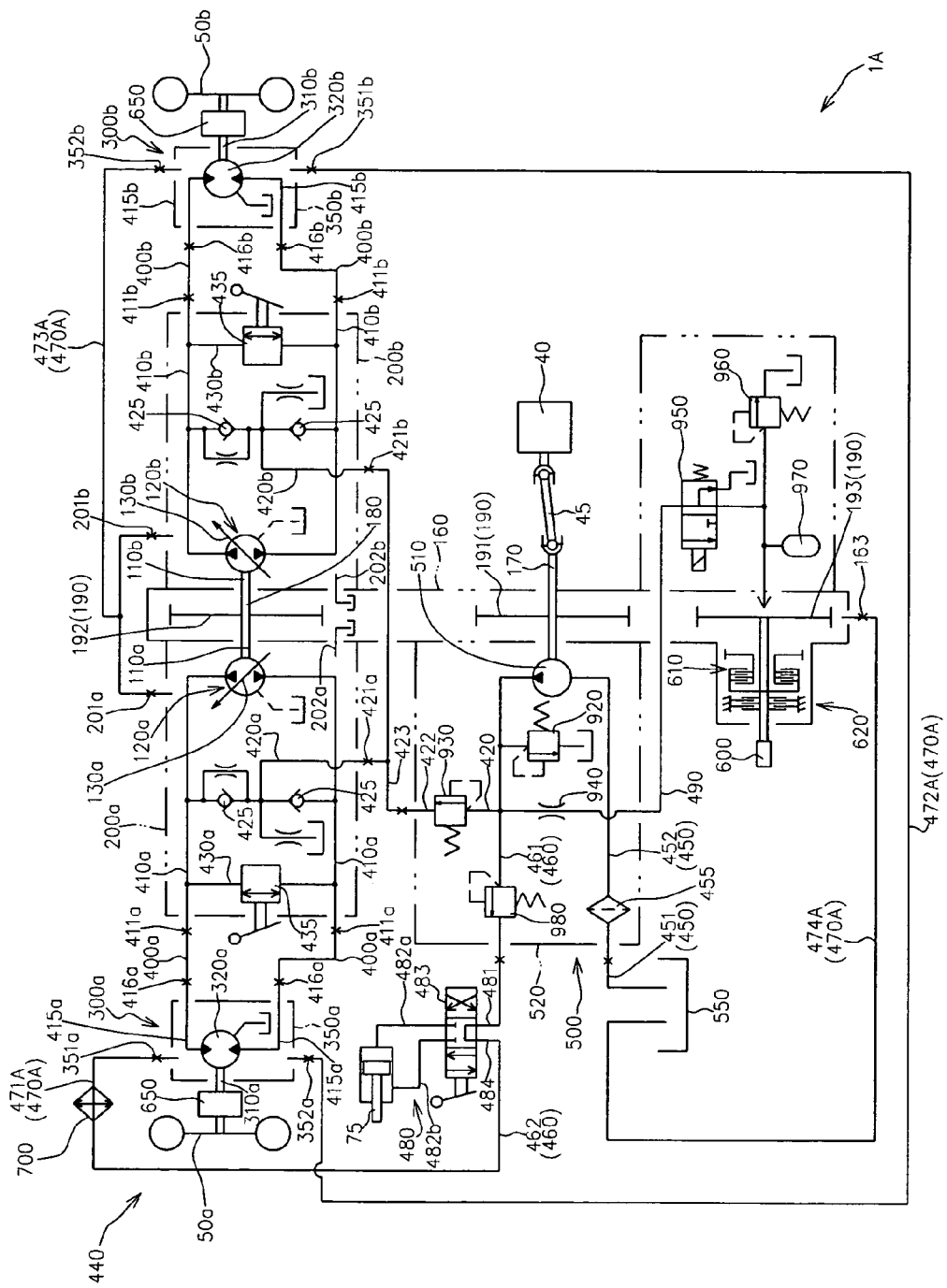
FIG. 3 is a hydraulic circuit diagram of the working vehicle according to the first embodiment.

FIGS. 1 to 3 show respectively a side view, a plan view and a hydraulic circuit diagram of the working vehicle 1A according to the present embodiment.

As shown in FIGS. 1 and 2, the working vehicle 1A includes a vehicle frame 30; a driving power source 40 mounted on the vehicle frame 30; a hydraulic pump unit 100 operatively connected to the driving power source 40; a pair of left and right driving wheels (rear wheels in the present embodiment) 50; a first hydraulic motor unit 300a arranged in proximity to one wheel 50a of the pair of driving wheels 50, the first hydraulic motor unit 300a being fluidly connected to the hydraulic pump unit 100 by way of a pair of first hydraulic fluid lines 400a; a second hydraulic motor unit 300b arranged in proximity to the other one of the pair of driving wheels 50, the second hydraulic motor unit 300b being fluidly connected to the hydraulic pump unit 100 by way of a pair of second hydraulic fluid lines 400b; an auxiliary pump unit 500 operatively driven by the driving power source 40; and an external reservoir tank 550 forming an oil source of the auxiliary pump unit 500.

Furthermore, as shown in FIGS. 1 and 2, the working vehicle 1A includes caster wheels 60, a mower device 70 operatively driven by the driving power source 40, and a discharge duct 80 forming a conveying passage for conveying the grass mowed by the mower device 70 towards the back of the vehicle.

Figure 4:
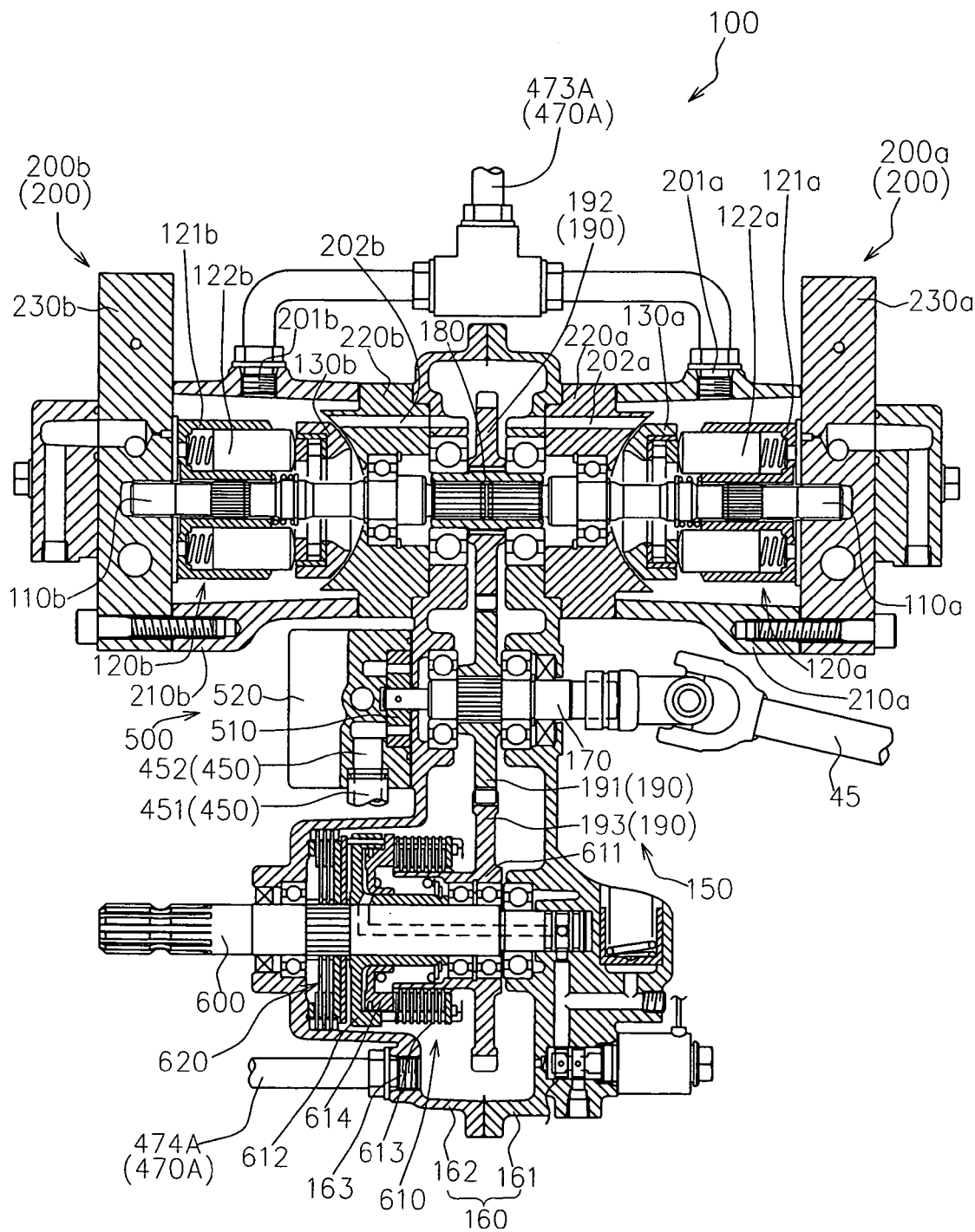
FIG. 4 is a vertical cross-sectional side view of a hydraulic pump unit in the working vehicle according to the first embodiment.

FIG. 4 shows a vertical cross-sectional side view of the hydraulic pump unit 100.

The hydraulic pump unit 100 is configured so as to form a first traveling system HST for driving the first driving wheel 50a with variable speeds in cooperation with the first hydraulic motor unit 300a, and so as to form a second traveling system HST for driving the second driving wheel 50b with variable speeds in cooperation with the second hydraulic motor unit 300b.

Specifically, the hydraulic pump unit 100 includes first and second pump shafts 110a, 110b operatively and rotatably driven by the driving power source 40; first and second hydraulic pump main bodies 120a, 120b rotatably driven by the first and second pump shafts 110a, 110b; first and second output adjusting members 130a, 130b for changing the supply/suction amount of the first and second hydraulic pump main bodies 120a, 120b, respectively; and a pump housing 150 for accommodating the first and second hydraulic pump main bodies 120a, 120b and having an inner space thereof capable of storing the oil.

The working vehicle 1A is so configured that the supply/suction amount of the first and second hydraulic pump main bodies 120a, 120b can be changed in the present embodiment, but in place thereof or in addition thereto, the supply/suction amount of the hydraulic motor main bodies 320a, 320b in the first and second hydraulic motor units 300a, 300b may be changed.

As shown in FIG. 4, the first hydraulic pump main body 120a includes a first cylinder block 121a supported by the first pump shaft 110a in a relatively non-rotatable manner, and a first piston unit 122a supported by the first cylinder block 121a in a relatively non-rotatable manner about the axis line and in a slidable manner in the axis line direction.

The second hydraulic pump main body 120b has substantially the same configuration as the first hydraulic pump main body 120a. Therefore, in the drawings, the same reference characters as the first hydraulic pump main body 120a with the suffix "b" in place of "a" are denoted for the second hydraulic pump main body 120b, and the detailed explanations thereof are omitted.

The first and second output adjusting members 130a, 130b are so configured to change the sliding range of the corresponding piston units 122a, 122b, respectively, to change the supply/suction amounts of the corresponding hydraulic pump main bodies 120a, 120b.

The output adjusting members 130a, 130b are movable swash plates in the present embodiment, as shown in FIG. 4.

The movable swash plates 130a, 130b are externally operable through a control shaft (not shown).

In the present embodiment, as shown in FIG. 4, the pump housing 150 includes a base housing 160 supported by a supporting member such as the vehicle frame 30, and a pump case 200 connected to the base housing 160 with accommodating the first and second hydraulic pump main bodies 120a, 120b therein.

The base housing 160 transmits the rotational power from the driving power source 40 to both the first and second pump shafts 110a, 110b, and has an inner space capable of storing the oil.

Specifically, the base housing 160 includes first and second housing portions 161, 162 removably connected to each other so as to form the inner space capable of storing the oil.

The base housing 160 is provided with an input shaft 170 supported by the base housing 160 so as to have a first end forming an input portion operatively connected to the driving power source 40, an output shaft 180 capable of outputting the rotational power towards the first and second pump shafts 110a, 110b, and a power transmission gear train 190 for transmitting the rotational power from the input shaft 170 to the output shaft 180.

The input shaft 170 is supported by the base housing 160 in a rotatable manner about the axis line with the first end extending outward.

In the present embodiment, the first end of the input shaft 170 is operatively connected to the output portion of the driving power source 40 by way of a transmission shaft 45 provided with universal joints on both ends.

Specifically, in the present embodiment, as shown in FIG. 1, the driving power source 40 is supported at the back region of the vehicle frame 30 by way of vibration absorbing members 41.

On the other hand, the base housing 160 is fixed and supported at the vehicle frame 30 by way of an attachment stay (not shown) so as to be positioned in front of the driving power source 40.

The input shaft 170 is connected to the driving power source 40 by way of the transmission shaft 45 with universal joints so as to absorb the vibration difference between the driving power source 40 and the base housing 160.

In the present embodiment, as shown in FIG. 4, the input shaft 170 also has a second end extending outward from the base housing 160.

An auxiliary pump main body 510 of the auxiliary pump unit 500 is supported by the second end of the input shaft 170.

The output shaft 180 is supported by the base housing 160 in a state accessible from the outside.

In the present embodiment, as shown in FIG. 4, the first and second hydraulic pump main bodies 120a, 120b are arranged in a distributed manner with the base housing 160 in between.

Therefore, the output shaft 180 can be accessed from both of the first and second housing portions 161, 162 that are joined to each other.

Specifically, the output shaft 180 is a hollow shaft, and the first and second pump shafts 110a, 110b are each internally inserted into the output shaft 180 in a relatively non-rotatable manner from both ends of the output shaft 180.

The power transmission gear train 190 is configured so as to transmit the rotational power of the input shaft 170 to the output shaft 180.

Specifically, the power transmission gear train 190 includes an input gear 191 supported by the input shaft 170 in a relatively non-rotatable manner, and a transmission gear 192 supported by the output shaft 180 in a relatively non-rotatable manner so as to engage with the input gear 191.

Furthermore, in the present embodiment, as shown in FIGS. 3 and 4, the base housing 160 is provide with a PTO shaft 600 having a first end extending outward, and a PTO clutch mechanism 610 having the driving side operatively connected to the input shaft 170 and the driven side operatively connected to the PTO shaft 600.

The PTO clutch mechanism 610 is accommodated in the base housing 160 while being supported by the PTO shaft 600.

Specifically, as shown in FIG. 4, the PTO clutch mechanism 610 includes a driving-side member 611 supported by the PTO shaft 600 in a relatively rotatable manner, the driving-side member 611 being operatively connected to the input shaft 170 by way of the power transmission gear train 190.

More specifically, in the present embodiment, as shown in FIG. 4, the power transmission gear train 190 includes a PTO transmission gear 193 that engages with the input gear 191, in addition to the input gear 191 and the transmission gear 192.

The PTO transmission gear 193 is relatively non-rotatable with respect to the driving-side member 611. The PTO transmission gear 193 is integrally formed with the driving-side member 611 in the present embodiment.

Furthermore, the PTO clutch mechanism 610 includes a driven-side member 612 supported by the PTO shaft 600 in a relatively non-rotatable manner; a friction plate unit 613 with a driving-side friction plate relatively non-rotatable and movable in the axis line direction with respect to the driving-side member 611 and a driven-side friction plate 654 relatively non-rotatable manner and movable in the axis line direction with respect to the driven-side member 612; and a clutch member 614 for switching between frictional engagement state and disengagement state of the friction plate unit 613.

The clutch member 614 includes a piston member for frictionally engaging the friction plate unit 613 and a bias member for biasing the piston member in a direction away from the friction plate unit 613, and the power is transmitted from the driving-side member 611 to the driven-side friction member 612 when the piston member is pressed against the biasing force of the bias member by the action of the hydraulic pressure so that the friction plate unit 613 is frictionally engaged.

Moreover, the base housing 160 is provided with a PTO brake mechanism 620 for applying the braking force to the PTO shaft 600 contradictory against the PTO clutch mechanism 610.

That is, the PTO brake mechanism 620 is configured so as to operatively apply the braking force to the PTO shaft 600 when the friction plate unit 613 is in the non-engagement state, and to release the braking force when the friction plate unit 613 is in the engagement state.

The pump case 200 accommodates the first and second hydraulic pump main bodies 120a, 120b and supports the first and second pump shafts 110a, 110b, and is connected to the base housing 160 so that the first and second pump shafts 110a, 110b are operatively connected to the output shaft 180.

In the present embodiment, the first and second hydraulic pump main bodies 120a, 120b are arranged in a distributed manner with the base housing in between, as described above (see FIG. 4).

Therefore, the pump case 200 includes a first pump case 200a for accommodating the first pump main body 120a and supporting the first pump shaft 110a, and a second pump case 200b for accommodating the second pump main body 120b and supporting the second pump shaft 110b.

Of course, the first and second hydraulic pump main bodies 120a, 120b may be disposed on the same side surface of the base housing 160 in a parallel manner.

In such case, the pump case 200 may be formed so as to accommodate both the first and second hydraulic pump main bodies 120a, 120b, and alternatively, may be configured so as to individually accommodate the first and second hydraulic pump main bodies 120a, 120b as in the present embodiment.

As shown in FIG. 4, the first pump case 200a includes a first pump case main body 210a for enclosing the first hydraulic pump main body 120a, a first swash plate receiving member 220a connected to a first end of the first pump case main body 210a so as to hold the swash plate serving as the first output adjusting member 130a in a slanting manner, and a pump-side first port block 230a formed with a feeding and discharging oil passage for the first hydraulic pump main body 120a.

The second pump case 200b has substantially the same configuration as the first pump case 200a. Therefore, in the drawings, the same reference characters as the first pump case 200a with the suffix "b" in place of "a" are denoted for the second pump case 200b, and the detailed explanations thereof are omitted.

The first pump case main body 210a has a hollow shape with a first end side and a second end side in the axis line direction opened.

The first swash plate receiving member 220a is configured to hold the first output adjusting member 130a, and to close the opening on the first end side of the first pump case main body 210a.

The first swash plate receiving member 220a is a separate body from the first pump case main body 210a in the present embodiment, but of course, the first swash plate receiving member 220a may be integrally formed with the first pump case main body 210a.

The opening on the second end side of the first pump case main body 210a has a size allowing the first pump main body 120a to be inserted through.

The pump-side first port block 230a is connected to the first pump case main body 210a so as to close the opening on the second end side while being fluidly connected to the first hydraulic pump main body 120a.

Specifically, as shown in FIG. 3, a pair of pump-side first hydraulic fluid passages 410a configuring a part of the pair of first hydraulic fluid lines 400a are formed at the pump-side first port block 230a.

Each of the pair of pump-side first hydraulic fluid passages 410a has a first end fluidly connected to the first hydraulic pump main body 120a by way of a kidney port provided in the pump-side first port block, and a second end opening to the outer surface of the pump-side first port block 230a to form a pump-side first hydraulic fluid port 411a.

As shown in FIG. 3, the pump-side first port block 230a is further provided with a first charge oil passage 420a for guiding the charge oil sent from the auxiliary pump unit 500 to the pair of first hydraulic fluid passages 410a, and a first bypass oil passage 430a for communicating between the pair of first hydraulic fluid passages 410a.

The first charge oil passage 420a has a first end opened to the outer surface of the pump-side first port block to form a first charge port 421a, and second ends fluidly connected to the pair of first hydraulic fluid passages 410a by way of check valves 425.

The first bypass oil passage 430a has a first end opened to one side surface of the pump-side first port block 230a, and an externally operable switching valve 435 for selectively communicating or shutting off the first bypass oil passage 430a is inserted from the opening.

In the present embodiment, as shown in FIG. 4, the thus configured first pump case 200a is connected to the base housing 160 with the first swash plate receiving member 220a contacting the base housing 160.

The auxiliary pump unit 500 is supported by the pump housing 150 while being operatively driven by the input shaft 170.

Specifically, the auxiliary pump unit 500 includes an auxiliary pump main body 510 supported by the input shaft 170 in a relatively non-rotatable manner, and an auxiliary pump case 520 connected to the base housing 160 so as to enclose the auxiliary pump main body 510.

In the present embodiment, the auxiliary pump main body 510 is rotatably driven by the second end of the input shaft 170.

The auxiliary pump case 520 is connected to the second housing portion 162 of the base housing 160 so as to enclose the auxiliary pump main body 510.

The first hydraulic motor unit 300a will now be described.

Figure 5:
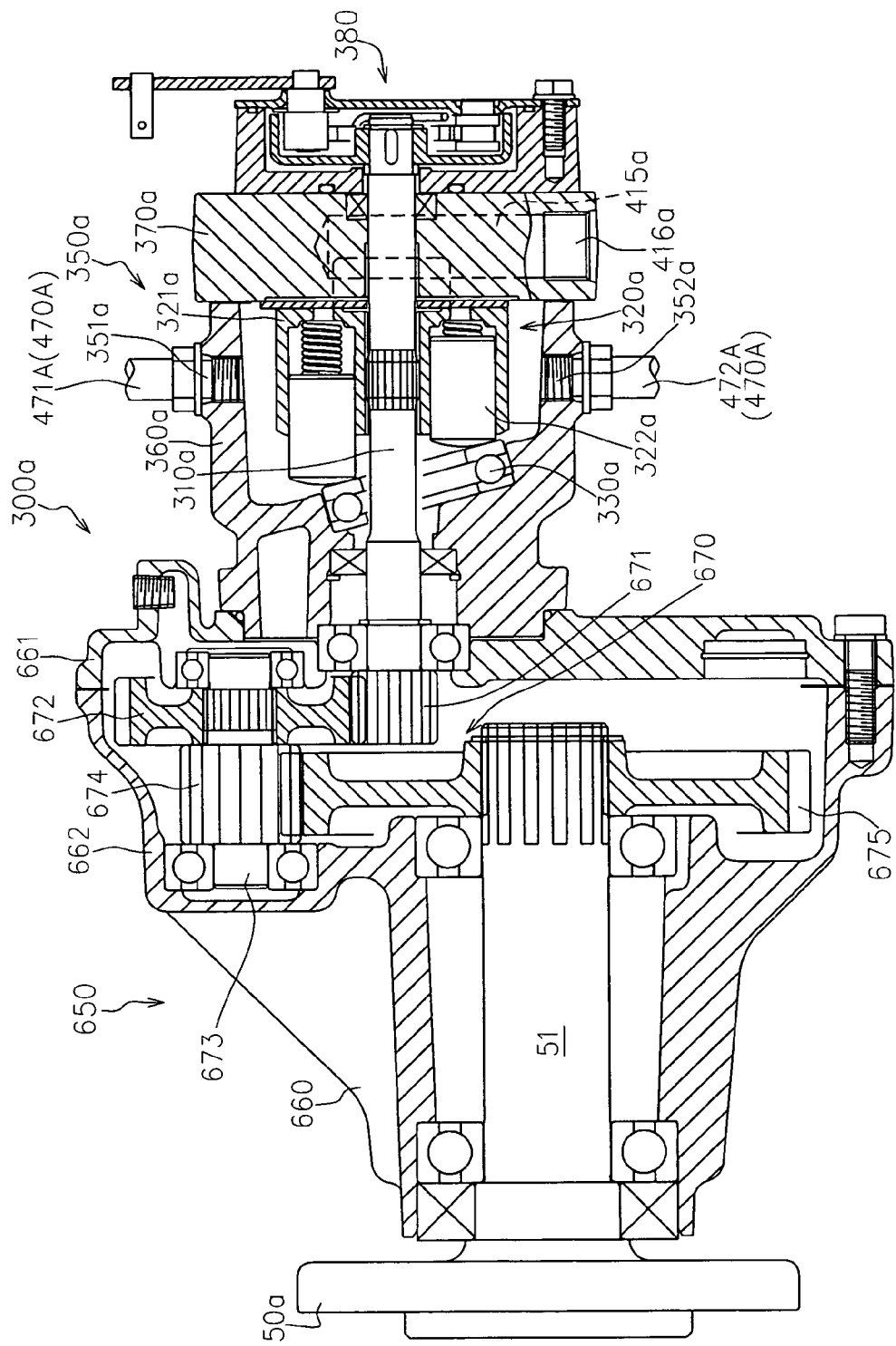
FIG. 5 is a vertical cross-sectional view of a first hydraulic motor unit in the working vehicle according to the first embodiment.

FIG. 5 shows a vertical cross-sectional view of the first hydraulic motor unit 300a.

The second hydraulic motor unit 300b has substantially the same configuration as the first hydraulic motor unit 300a. Thus, the detailed description of the second hydraulic motor unit will not be given.

As shown in FIG. 5, the first hydraulic motor unit 300a configures a wheel motor device that drives a corresponding driving wheel 50a with variable speeds, along with a cooperating reduction gear unit 650.

Specifically, the first hydraulic motor unit 300a includes a first hydraulic motor main body 320a fluidly connected to the corresponding first hydraulic pump main body 120a by way of the pair of first hydraulic fluid lines 400a, a first motor shaft 310a for supporting the first hydraulic motor main body 320a in a relatively non-rotatable manner, and a first motor case 350a for enclosing the first hydraulic motor main body 320a.

In the present embodiment, the hydraulic pump unit 100 is of a variable displacement type, and the first hydraulic motor unit 300a is of a fixed displacement type in which the supply/suction amount of the first hydraulic motor main body 320a is fixed, as described above.

Therefore, the first hydraulic motor unit 300a includes a first fixed swash plate 330a (see FIG. 5) in addition to the above configuration.

The first motor shaft 310a is supported by the first motor case 350a with an outer end in the vehicle width direction extending outwards.

The first hydraulic motor main body 320a includes a first cylinder block 321a supported by the first motor shaft 310a in a relatively non-rotatable manner, and a first piston unit 322a supported by the first cylinder block 321a in a relatively non-rotatable manner and in a slidable manner in the axis line direction.

The first motor case 350a accommodates the first hydraulic motor main body 320a and supports the first motor shaft 310a, and has an inner space capable of storing the oil.

Specifically, the first motor case 350a includes a first motor case main body 360a for enclosing the first hydraulic motor main body 320a and a motor-side first port block 370a removably connected to the first motor case main body 360a.

The first motor case main body 360a has a closed end face at an outer end side in the vehicle width direction, and an opening, through which the first hydraulic motor main body 320a is inserted, at an inner end side in the vehicle width direction.

The inner peripheral surface of the closed end face of the first motor case main body 360a is configured so as to hold the first fixed swash plate 330a.

The motor-side first port block 370a is connected to the first motor case main body 360a so as to liquid-tightly close the opening on the inner end side while being fluidly connected to the first hydraulic motor main body 320a.

Specifically, as shown in FIGS. 3 and 5, the motor-side first port block 370a is provided with a pair of motor-side first hydraulic fluid passages 415a configuring a part of the pair of first hydraulic fluid lines 400a.

Each of the pair of motor-side first hydraulic fluid passages 415a has a first end fluidly connected to the first hydraulic motor main body 320a by way of a kidney port provided at the motor-side first port block 370a and a second end opened to the outer surface of the motor-side first port block 370a to form a motor-side first hydraulic fluid port 416a.

Further, in the present embodiment, the first hydraulic motor unit 300a includes a brake unit 380 for applying the braking force to the first motor shaft 310a based on the external operation.

Specifically, the first motor shaft 310a is so configured that its inner end in the vehicle width direction is also extended outward from the first motor case 350a, in addition to its outer end in the vehicle width direction.

The brake unit 380 is connected to the inner end face in the vehicle width direction of the motor-side first port block 370a so as to apply the braking force to the inner end in the vehicle width direction of the motor shaft 310a.

The reduction gear unit 650 is configured to reduce and transmit the rotational power of a corresponding motor shaft 310a to a corresponding driving axle 51.

Specifically, the reduction gear unit 650 includes a reduction gear case 660 and a reduction gear train 670 accommodated in the reduction gear case 660.

The reduction gear case 660 includes a first portion 661 facing a corresponding first hydraulic motor unit 300a, and a second portion 662 removably connected to the first portion 661 so as to face a corresponding driving wheel 50a.

In the present embodiment, the first portion 661 is provided with an opening into which the outer end in the vehicle width direction of the first motor shaft 310a is inserted, and the second portion 662 is provided with an opening into which the driving axle 51 is inserted.

The reduction gear train 670 includes a first driving gear 671 that is relatively non-rotatable with respect to the first motor shaft 310a; a first driven gear 672 that has a larger diameter than the first driving gear 671 and that engages with the first driving gear 671; a counter shaft 673 that is relatively non-rotatable with respect to the first driven gear 672; a second driving gear 674 that is relatively non-rotatable with respect to the counter shaft 673; and a second driven gear 675 that has a larger diameter than the second driving gear 674 and that is relatively non-rotatable with respect to the driving axle 51 in a state of engaging with the second driving gear 674.

By reducing the rotational power of the first hydraulic motor unit 300a by means of the reduction gear unit 650 and transmitting the result to the driving wheel 50a as described above, low torque and high rotational hydraulic motor main body could be used as the first hydraulic motor main body 320a in the first hydraulic motor unit 300a.

Accordingly, along with miniaturization of the first hydraulic motor main body 320a, reduction of hydraulic fluid leakage amount from the first hydraulic motor main body 320a could be achieved, and thereby enhancing the transmission efficiency of the HST.

A hydraulic circuit of the working vehicle 1A according to the present embodiment will now be described.

The working vehicle 1A includes, in addition to the various hydraulic lines described above, a circulation line 440 for fluidly connecting the auxiliary pump main body 510, the first pump case 200a, the second pump case 200b, the first motor case 350a, and the second motor case 350b so that at least one part of pressure oil suctioned from the oil source by the auxiliary pump main body 510 and then discharged returns again to the suction side of the auxiliary pump main body 510 through the pump cases 200a, 200b and the motor cases 350a, 350b; and an oil cooler 700 interposed in the circulation line 440.

Specifically, as shown in FIG. 3, the circulation line 440 includes a suction line 450 for fluidly connecting the external reservoir tank 550 and the suction side of the auxiliary pump main body 510; a discharge line 460 for fluidly connecting the discharge side of the auxiliary pump main body 510 and the oil cooler 700; and a return line 470A for returning the oil, which has been cooled by the oil cooler 700, to the external reservoir tank 550 through the pump cases 200a, 200b and the motor cases 350a, 350b.

The suction line 450 includes a suction conduit 451 fluidly connected to the external reservoir tank 550, and a suction oil passage 452 formed in the auxiliary pump case 520.

The suction oil passage 452 has a first end opened to the outer surface of the auxiliary pump case 520 and a second end fluidly connected to the suction side of the auxiliary pump case main body 510.

In the present embodiment, an oil filter 455 is connected to the auxiliary pump case 520 so as to be interposed in the suction oil passage 452 (see FIG. 3).

The discharge line 460 includes a discharge oil passage 461 formed in the auxiliary pump case 520, and a discharge conduit 462 extending between the discharge oil passage 461 and the oil cooler 700.

The discharge oil passage 461 has a first end fluidly connected to the discharge side of the auxiliary pump main body 510 and a second end opened to the outer surface of the auxiliary pump case 520.

In the present embodiment, a safety valve 920 and a charge relief valve 980 are interposed in the discharge oil passage 461 (see FIG. 3).

The relief oil from the safety valve 920 is returned to the oil reservoir (the base housing 160).

The relief oil from the charge relief valve 980 is supplied to the discharge conduit 462.

Furthermore, as shown in FIG. 3, the working vehicle 1A includes, in addition to the various hydraulic lines described above, a charge line 420 having a first end fluidly connected to the discharge line 460 via a resistor valve 930 at a portion between the safety valve 920 and the charge relief valve 980; and a PTO line 490 having a first end fluidly connected to the discharge line 460 via an orifice 940 at a portion between the safety valve 920 and the charge relief valve 980.

The charge line 420 includes a common charge oil passage 422 having a first end fluidly connected to the discharge oil passage 461 at a portion between the safety valve 920 and the charge relief valve 980 via the resistor valve 930 and a second end opened to the outer surface of the auxiliary pump case 520; a charge conduit 423 for fluidly connecting the second end of the common charge oil passage 422 to the first charge port 421a and the second charge port 421b; and the first and second charge oil passages 420a, 420b.

As shown in FIG. 3, the PTO line 490 has a first end fluidly connected to the discharge oil passage 461 at a portion between the safety valve 920 and the charge relief valve 980 via the orifice 940, and a second end fluidly connected to the PTO clutch mechanism 610 via a PTO clutch ON/OFF valve 950, a PTO clutch hydraulic pressure setting relief valve 960, and an accumulator 970.

Furthermore, the working vehicle 1A includes a working machine line 480 interposed in the discharge line 460.

As shown in FIG. 3, the working machine line 480 is configured so as to supply the pressure oil discharged from the discharge oil passage 461 to a working machine hydraulic mechanism 75 (e.g., mower lifting and lowering hydraulic mechanism), and return the return oil from the working machine hydraulic mechanism 75 to the discharge conduit 462.

In the present embodiment, the working machine line 480 includes a supply line 481 having a first end fluidly connected to the discharge line 460 on the downstream side of the charge relief valve 980; first and second hydraulic lines 482a, 482b extending between the supply line 481 and the working machine hydraulic mechanism 75; a switching valve 483 interposed between the supply line 481 and the first and second hydraulic lines 482a, 482b; and a discharge line 484 having a first end selectively connected to the supply line 481, the first hydraulic line 482a or the second hydraulic line 482b by way of the switching valve 483 and a second end connected to the discharge line 460.

The oil cooler 700 is fluidly connected to the downstream end of the discharge line 460.

That is, in the present embodiment, the relief oil of the charge relief valve 980 is supplied to the oil cooler 700 directly or indirectly through the working machine hydraulic mechanism 75.

The return line 470A is configured so as to return the oil, which has been cooled by the oil cooler 700, to the external reservoir tank 550 through the pump cases 200a, 200b and the motor cases 350a, 350b.

As described above, in the working vehicle 1A according to the present embodiment, at least a part of the pressure oil, which has been discharged from the auxiliary pump main body 510, is supplied to the oil cooler 700 through the discharge line 460, and the oil, which has been cooled by the oil cooler 700, is returned to the external reservoir tank 550 after passing through the pump cases 200a, 200b and the motor cases 350a, 350b by way of the return line 470A.

Accordingly, rise in temperature of the hydraulic pump main bodies 120a, 120b in the pump cases 200a, 200b and the hydraulic motor main bodies 320a, 320b in the motor cases 350a, 350b is effectively prevented, and therefore, degradation in the transmission efficiency of the first HST and the second HST is effectively suppressed.

In the present embodiment, as shown in FIG. 3, the return line 470A is configured to fluidly connect the first motor case 350a, the second motor case 350b, and the pump housing 150 in series.

Specifically, as shown in FIGS. 1 to 5, the return line 470A includes a first motor case oil-introducing port 351a and a first motor case oil-discharging port 352a formed in the first motor case 350a so as to open the inner space of the first motor case 350a outward; a second motor case oil-introducing port 351b and a second motor case oil-discharging port 352b formed in the second motor case 350b so as to open the inner space of the second motor case 350b outward; a first pump case oil-introducing port 201a formed in the first pump case 200a so as to open the inner space of the first pump case 200a outward; a first flow-in oil passage 202a formed in the first pump case 200a and the base housing 160 so as to communicate the inner space of the first pump case 200a to the inner space of the base housing 160; a second pump case oil-introducing port 201b formed in the second pump case 200b so as to open the inner space of the second pump case 200b outward; a second flow-in oil passage 202b formed in the second pump case 200b and the base housing 160 so as to communicate the inner space of the second pump case 200b to the inner space of the base housing 160; a base housing oil-discharging port 163 for opening the inner space of the base housing 160 outward; a first conduit 471A having a first end fluidly connected to the oil cooler 700 and a second end fluidly connected to the first motor case oil-introducing port 351a; a second conduit 472A having a first end fluidly connected to the first motor case flow-out port 352a and a second end fluidly connected to the second motor case oil-introducing port 351b; a third conduit 473A having a first end fluidly connected to the second motor case oil-discharging port 352b and a second end fluidly connected to both the first pump case oil-introducing port 201a and the second pump case oil-introducing port 201b; and a fourth conduit 474A having a first end fluidly connected to the base housing oil-discharging port 163 and a second end fluidly connected to an oil flow-in port 552 of the external reservoir tank 550.

In the present embodiment, as shown in FIG. 4, the first pump shaft 110a and the second pump shaft 110b are supported by way of bearing members while being inserted through the pass-through holes formed in the corresponding pump cases 200a, 200b and the base housing.

Therefore, the flow of oil from the first and second pump cases 200a, 200b to the base housing 160 is also carried out through the pass-through holes in addition to the first and second flow-in oil passages.

The first and second flow-in oil passages 202a, 202b may be omitted if the flow of oil from the first and second pump cases 200a, 200b to the base housing 160 is sufficiently achieved through the pass-through holes.

Preferably, as shown in FIG. 1, the base housing 160 and the external reservoir tank 550 are arranged on the vehicle frame 30 so that the vertical position of the base housing oil-discharging port 163 is substantially the same as that of the oil flow-in port 552 of the external reservoir tank 550, or is higher than that of the oil flow-in port 552.

According to the configuration, even if the oil in the base housing 160 becomes the natural pressure due to pressure loss of the return line 470A, the oil in the base housing 160 could be effectively returned to the external reservoir tank 550.

The reservoir tank 550 is arranged on the vehicle front side of the hydraulic pump unit 100 in the present embodiment, as shown in FIG. 1, but the reservoir tank 550 may obviously be arranged at an appropriate space as desired such as below the driving power source.

More preferably, the base housing oil-discharging port 163 may be arranged so as to overlap at least one part of the PTO clutch mechanism 610 in front view, in a state where the base housing 160 is mounted on the vehicle frame 30.

In the present embodiment, as shown in FIG. 4, the base housing oil-discharging port 163 is arranged so as to overlap the driving-side member 611 of the PTO clutch mechanism 610 in front view.

According to such configuration, lubrication of the PTO clutch mechanism 610 is efficiently performed without providing a lubricating configuration.

More preferably, the base housing oil-discharging port 163 is arranged below the PTO shaft 600, in a state where the base housing 160 is mounted on the vehicle frame 30.

According to such configuration, worsening in the transmission efficiency of the PTO system transmitting path due to the stirring resistance of the oil in the base housing 160 is prevented as much as possible while maintaining the lubricating efficiency of the PTO clutch mechanism 610.

Figure 6:
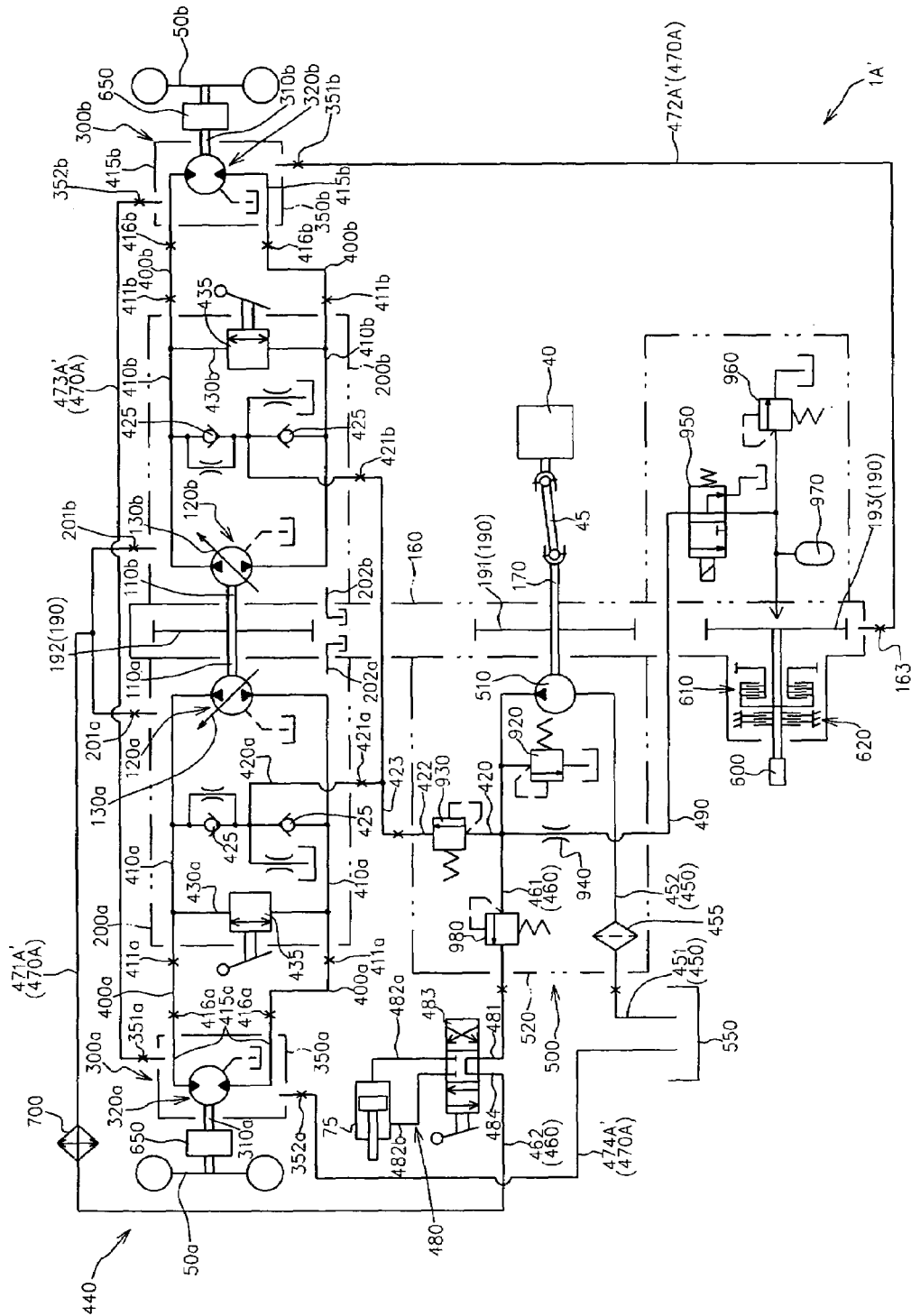
FIG. 6 is a hydraulic circuit diagram of a modified working vehicle according to the first embodiment.

In the present embodiment, the return line 470A fluidly connects the first motor case 350a, the second motor case 350b, and the first and second pump cases 200a, 200b in series so as to sequentially flow the oil, which has been cooled by the oil cooler 700, through one of the first and second motor cases 350a, 350b (first motor case 350a in the present embodiment) to the other motor (second motor case 350b in the present embodiment), and thereafter flow the oil to the first and second pump cases 200a, 200b, as described above, but of course, the cooled oil, which has been cooled by the oil cooler 700, may be first flown to the first and second pump cases 200a, 200b, and thereafter sequentially flown, through one of the first and second hydraulic motor cases 350a, 350b to the other, as shown in FIG. 6.

That is, in the modified example shown in FIG. 6, the return line 470A includes the first motor case oil-introducing port 351a; the first motor case oil-discharging port 352a; the second motor case oil-introducing port 351b; the second motor case oil-discharging port 352b; the first pump case oil-introducing port 201a; the first flow-in oil passage 202a; the second pump case oil-introducing port 201b; the second flow-in oil passage 202b; the base housing oil-discharging port 163; a first conduit 471A' having a first end fluidly connected to the oil cooler 700 and second ends fluidly connected to the first and second pump cases 200a, 200b; a second conduit 472A' having a first end fluidly connected to the base housing oil-discharging port 163 and a second end fluidly connected to the second motor case oil-introducing port 351b; a third conduit 473A' having a first end fluidly connected to the second motor case oil-discharging port 352b and a second end fluidly connected to the first motor case oil-introducing port 351a; and a fourth conduit 474A' having a first end fluidly connected to the first motor case oil-discharging port 352a and a second end fluidly connected to the oil flow-in port 552 of the external reservoir tank 550.

Embodiment 2

Another embodiment of the working vehicle according to the present invention will now be described with reference to the attached drawings.

Figure 7:
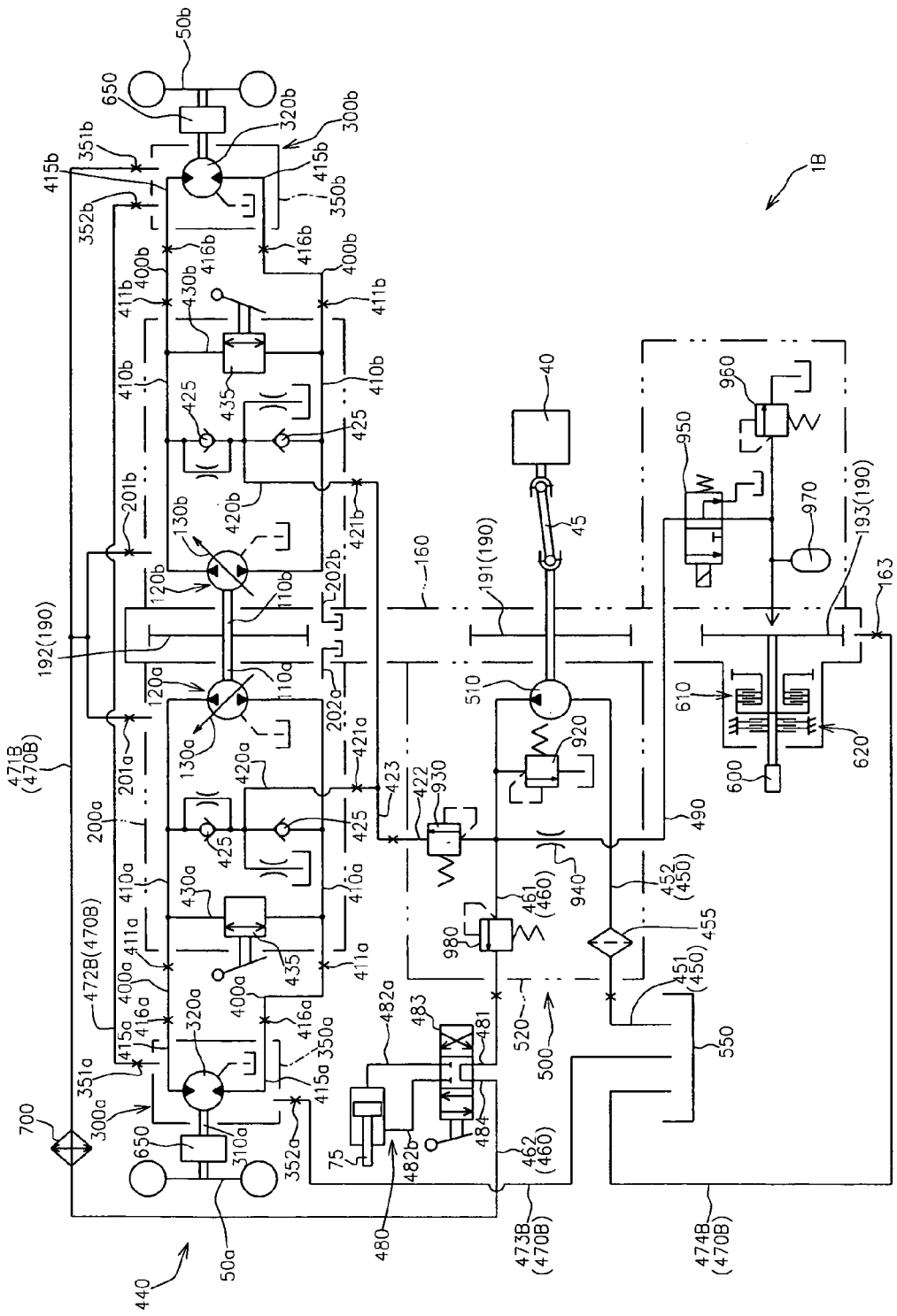
FIG. 7 is a hydraulic circuit diagram of a working vehicle according to a second embodiment of the present invention.

FIG. 7 shows a hydraulic circuit diagram of a working vehicle 1B according to the present embodiment.

In the figure, the same reference characters are denoted for the same members as in embodiment 1, and the detailed explanations thereof are omitted.

The working vehicle 1B according to the present embodiment differs from the working vehicle 1A according to embodiment 1 only with respect to the configuration of the return line 470A.

That is, the working vehicle 1B includes a return line 470B in place of the return line 470A in the working vehicle 1A.

As shown in FIG. 7, the return line 470B is configured so as to fluidly connect one of the first and second motor cases 350a, 350b (second motor case 350b in the present embodiment) and the first and second pump cases 200a, 200b in parallel, and fluidly connect the other motor case (first motor case 350a in the present embodiment) with the one motor case 350b in series, and to connect the base housing 160 and the other motor case 350a respectively to the external reservoir tank 550.

Specifically, the return line 470B includes the first motor case oil-introducing port 351a; the first motor case oil-discharging port 352a; the second motor case oil-introducing port 351b; the second motor case oil-discharging port 352b; the first pump case oil-introducing port 201a; the first flow-in oil passage 202a; the second pump case oil-introducing port 201b; the second flow-in oil passage 202b; the base housing oil-discharging port 163; a first conduit 471B having a first end fluidly connected to the oil cooler 700 and second ends fluidly connected to the second motor case oil-introducing port 351b, the first pump case oil-introducing port 201a and the second pump case oil-introducing port 201b; a second conduit 472B having a first end fluidly connected to the second motor case oil-discharging port 352b and a second end fluidly connected to the first motor case oil-introducing port 351a; a third conduit 473B having a first end fluidly connected to the first motor case oil-discharging port 352a and a second end fluidly connected to the flow-in port 552 of the external reservoir tank 550; and a fourth conduit 474B having a first end fluidly connected to the base housing oil-discharging port 163 and a second end fluidly connected to the oil flow-in port 552 of the external reservoir tank 550.

Similarly to the embodiment 1, in the working vehicle 1B as well, rise in temperature of the hydraulic pump main bodies 120a, 120b in the pump cases 200a, 200b and the hydraulic motor main bodies 320a, 320b in the motor cases 350a, 350b are effectively prevented, and thus worsening in the transmission efficiency of the first HST and the second HST are effectively suppressed.

Furthermore, in the present embodiment, the entire length of the conduit in the return line 470B is made shorter than that in the embodiment 1.

Therefore, compared to the embodiment 1, pressure loss in the return line 470B is reduced, and cooling efficiency of the pump case main bodies 120a, 120b and the motor case main bodies 320a, 320b by the return line 470B is enhanced.

Embodiment 3

Still another embodiment of the working vehicle according to the present invention will now be described with reference to the attached drawings.

Figure 8:
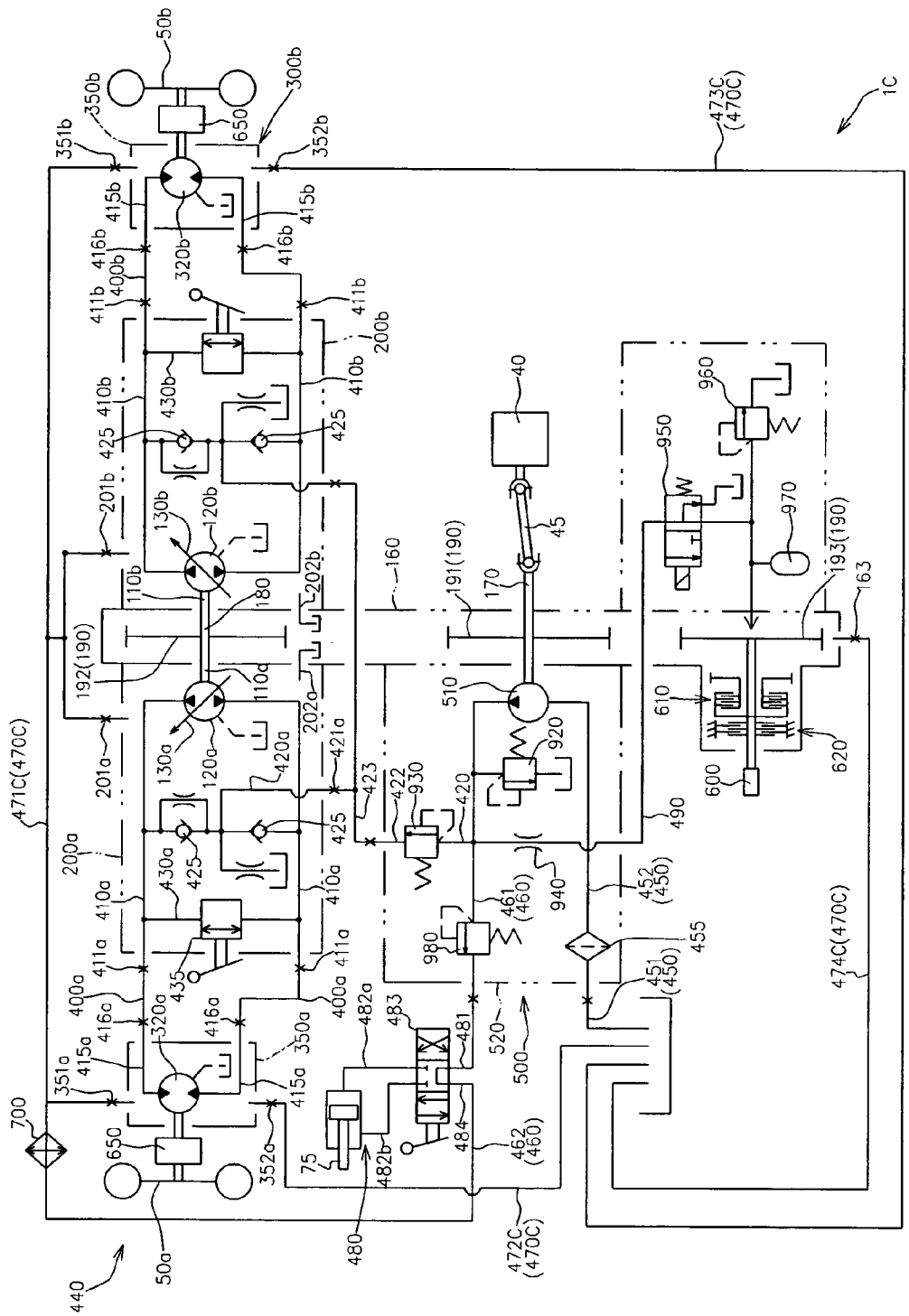
FIG. 8 is a hydraulic circuit diagram of a working vehicle according to a third embodiment of the present invention.

FIG. 8 shows a hydraulic circuit diagram of a working vehicle 1C according to the present embodiment.

In the figure, the same reference characters are denoted for the same members as the embodiment 1 or 2, and the detailed explanations thereof are omitted.

The working vehicle 1C according to the present embodiment differs from the working vehicles 1A and 1B according to the embodiments 1 and 2 only with respect to the configuration of the return lines 470A and 470B.

That is, the working vehicle 1C includes a return line 470C in place of the return lines 470A and 470B in the working vehicles 1A and 1B.

As shown in FIG. 8, the return line 470C is configured so as to fluidly connect all of the first and second motor cases 350a, 350b and the pump cases 200a, 200b in parallel.

Specifically, the return line 470C includes the first motor case oil-introducing port 351a; the first motor case oil-discharging port 352a; the second motor case oil-introducing port 351b; the second motor case oil-discharging port 352b; the first pump case oil-introducing port 201a; the first flow-in oil passage 202a; the second pump case oil-introducing port 201b; the second flow-in oil passage 202b; the base housing oil-discharging port 163; a first conduit 471C having a first end fluidly connected to the oil cooler 700 and second ends fluidly connected to the first motor case oil-introducing port 351a, the second motor case oil-introducing port 351b, the first pump case oil-introducing port 201a and the second pump case oil-introducing port 201b; a second conduit 472C having a first end fluidly connected to the first motor case oil-discharging port 351b and a second end fluidly connected to the flow-in port 552 of the external reservoir tank 550; a third conduit 473C having a first end fluidly connected to the second motor case oil-discharging port 352b and a second end fluidly connected to the flow-in port 552 of the external reservoir tank 550; and a fourth conduit 474C having a first end fluidly connected to the base housing oil-discharging port 163 and a second end fluidly connected to the oil flow-in port 552 of the external reservoir tank 550.

Similarly to the embodiment 1 and 2, in the working vehicle 1C as well, rise in temperature of the hydraulic pump main bodies 120a, 120b in the pump cases 200a, 200b and the hydraulic motor main bodies 320a, 320b in the motor cases 350a, 350b are effectively prevented, and thus worsening in the transmission efficiency of the first HST and the second HST are effectively suppressed.

Furthermore, in the present embodiment, the entire length of the conduit in the return line 470C is made still shorter than that in the embodiment 2.

Therefore, compared to the embodiments 1 and 2, pressure loss in the return line 470B is reduced, and cooling efficiency of the pump case main bodies 120a, 120b and the motor case main bodies 320a, 320b by the return line 470B is enhanced.

Embodiment 4

Still another embodiment of the working vehicle according to the present invention will now be described with reference to the attached drawings.

Figure 9:
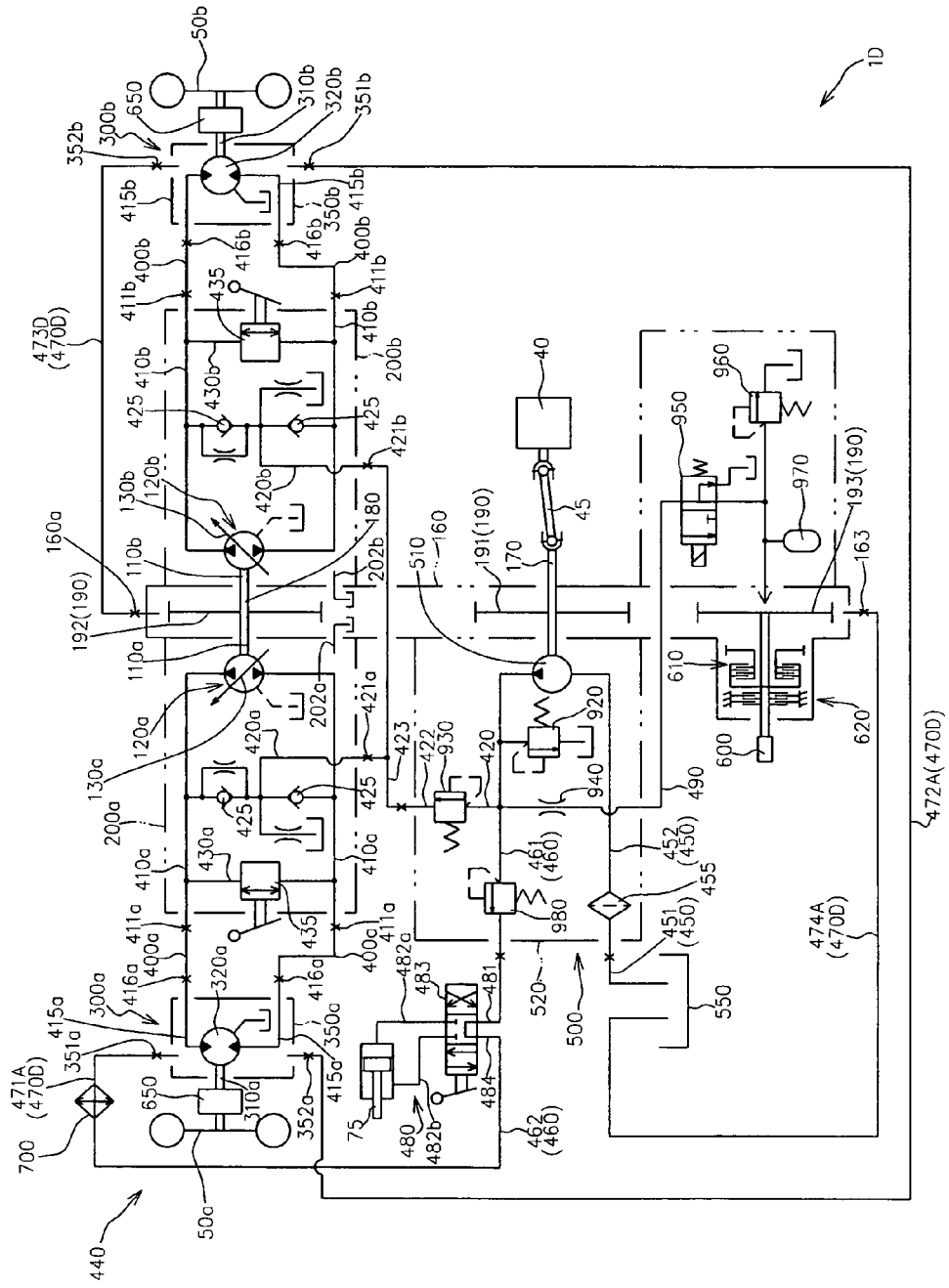
FIG. 9 is a hydraulic circuit diagram of a working vehicle according to a fourth embodiment of the present invention.

FIG. 9 shows a hydraulic circuit diagram of a working vehicle 1D according to the present embodiment.

In the figure, the same reference characters are denoted for the same members as in the embodiments 1-3, and the explanations thereof are omitted.

The working vehicle 1D according to the present embodiment differs from the working vehicle 1A according to the embodiment 1 only with respect to the configuration of the return line 470A.

That is, the working vehicle 1D includes a return line 470D in place of the return line 470A in the working vehicle 1A.

As shown in FIG. 3, the return line 470A is configured so that the oil, which has been cooled by the oil cooler 700 is passed through the inner spaces of the motor cases 350a, 350b, and then flown into the inner space of the base housing 160 through the inner spaces 200a, 200b, and thereafter returned to the external reservoir tank 550.

On the contrary, the return line 471D of the present embodiment is configured so that the oil, which has been cooled by the oil cooler 700, is passed through the inner spaces of the motor cases 350a, 350b, and then flown into the inner space of the base housing 160 without passing through the inner spaces of the pump cases 200a, 200b, and thereafter returned to the external reservoir tank 550.

Specifically, the return line 470D includes the first motor case oil-introducing port 351a; the first motor case oil-discharging port 352a; the second motor case oil-introducing port 351b; the second motor case oil-discharging port 352b; a base housing oil-introducing port 160a formed in the base housing 160 so as to open the inner space of the base housing 160 outward; the base housing oil-discharging port 163; the first conduit 471A; the second conduit 472A; a third conduit 473D having a first end fluidly connected to the second motor case oil-discharging port 352b and a second end fluidly connected to the base housing oil-introducing port 160a; and the fourth conduit 474A.

In the present embodiment, the first and second flow-in oil passages 202a, 202b are used as passages for flowing the oil, which is leaked from the first and second hydraulic pump main bodies 120a, 120b, into the base housing 160.

In the thus configured working vehicle 1D, rise in temperature of the PTO clutch device 610 accommodated within the base housing 160 could be prevented, as well as rise in temperature of the hydraulic pump main bodies 120a, 120b in the pump cases 200a, 200b are effectively prevented, and thus worsening in the transmission efficiency of the first HST and the second HST are effectively suppressed.

The return line 470D is configured so as to fluidly connect the first motor case 350a, the second motor case 350b and the base housing 160 in series in the present embodiment, but of course, the return line 470D may be configured so as to fluidly connect one of the first and second motor cases 350a, 350b (for example, the second motor case 350b) and the base housing 160 in parallel, and fluidly connect the other of the first and second motor cases 350a, 305b (for example, the first motor case 350a) to the one of the first and second motor cases 350a, 350b in series, and fluidly connect the base housing 160 and the other motor case to the external reservoir tank 550, as similar to the embodiment 2. Alternatively to this, the return line 470D may be configured so as to fluidly connect all of the first and second motor cases 350a, 350b and the base housing 160 in parallel, as similar to the embodiment 3.

However the working vehicle 1D is configured so that the cooled oil is bypassed the first and second pump cases 200a, 200b in the present embodiment, in place of or in addition to the configuration, the cooled oil may be bypassed the base housing 160.

In each of the above embodiments, a case where the first and second hydraulic pump main bodies 120a, 120b are each independently fluidly connected to the first and second hydraulic motor main bodies 320a, 320b has been described as an example, but the present invention is not limited thereto.

That is, the first and second hydraulic motor main bodies 320a, 320b may be fluidly connected by a pair of motor-side lines, and the pair of motor-side lines and a single traveling hydraulic pump main body may be fluidly connected by way of a pair of hydraulic fluid lines.

In the configuration, for example, either one of the first and second hydraulic pump main bodies 120a, 120b in each of the above embodiments may be used as the traveling hydraulic pump main body, and the other one of the first and second hydraulic pump main bodies 120a, 120b may be omitted or used as a hydraulic source of another hydraulic equipment.

Embodiment 5

Still another embodiment of the working vehicle according to the present invention will now be described with reference to the attached drawings.

Figure 10:
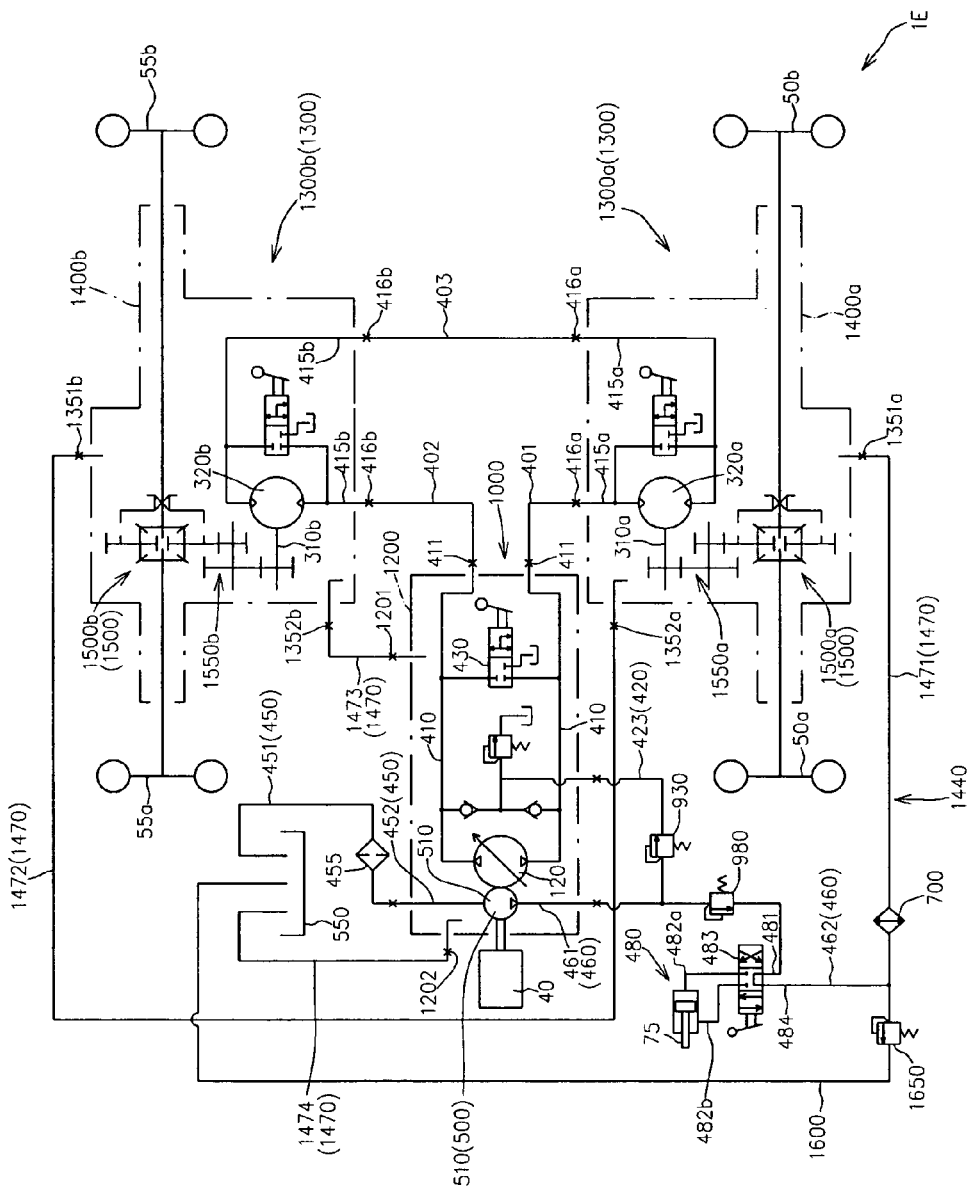
FIG. 10 is a hydraulic circuit diagram of a working vehicle according to a fifth embodiment of the present invention.

FIG. 10 shows a hydraulic circuit diagram of a working vehicle 1E according to the present embodiment.

In the figure, the same reference characters are denoted for the same members as in the embodiments 1-4, and the explanations thereof are omitted.

The working vehicles according to the embodiments 1-4 are of a wheel motor type in which the hydraulic motor unit is provided for each of the right and left driving wheels. On the contrary, the working vehicle 1E according to the present embodiment, as shown in FIG. 10, is of a mechanical differential type in which an output of a hydraulic motor unit 1300 spaced apart from a hydraulic pump unit 1000 is differentially transmitted to the pair of right and left driving wheels via a mechanical differential gear device 1500.

Specifically, the working vehicle 1E includes a hydraulic pump unit 1000 operatively driven by the driving power source 40; a hydraulic motor unit 1300 spaced away from the hydraulic pump unit 1000; a differential gear device 1500 differentially transmitting an output of a motor shaft 310 of the hydraulic motor unit 1300 to the pair of right and left driving wheels; the auxiliary pump unit 500 operatively driven by the driving power source 40; and the external reservoir tank 550.

In the present embodiment, the working vehicle 1E is a four-wheel-drive working vehicle. Accordingly, the working vehicle 1E includes a first hydraulic motor unit 1300a for driving a pair of first right and left driving wheels 50a, 50b that are disposed at one side in the fore-and-aft direction of the vehicle and a second hydraulic motor unit 1300b for driving a pair of second right and left driving wheels 55a, 55b that are disposed at the other side in the fore-and-aft direction of the vehicle, as the hydraulic motor unit 1300; and includes a first differential gear device 1500a for differentially transmitting an output of a motor shaft 310a of the first hydraulic motor unit 1300a to the pair of first driving wheels 50a, 50b and a second differential gear device 1500b for differentially transmitting an output of a motor shaft 310b of the second hydraulic motor unit 1300b to the pair of second driving wheels 55a, 55b, as the differential gear device 1500.

The hydraulic pump unit 1000 includes the hydraulic pump main body 120 operatively driven by the driving power source 40, and a pump case 1200 accommodating the hydraulic pump main body 120 and having an inner space capable of storing the oil.

The pump case 1200 is provided with a pair of pump-side hydraulic fluid passages 410.

The pair of pump-side hydraulic fluid passages 410 has first ends fluidly connected to the hydraulic pump main body 120, and second ends opening to the outer surface of the pump case 1200 to form a pair of pump-side hydraulic fluid ports 411.

The pump case 1200 may include a hollow pump case main body and a pump-side port block detachably connected to the pump case man body. The pump-side hydraulic fluid passages 410 are, for example, formed in the pump-side port block.

The pump case 1200 is further provided with a pump case oil-introducing port 1201 and a pump case oil-discharging port 1202 that open an inner space of the pump case 1200 outside. The pump case oil-introducing port 1201 and the pump case oil-discharging port 1202 are, for example, formed in the pump case main body.

The first hydraulic motor unit 1300a includes the first hydraulic motor main body 320a fluidly connected to the hydraulic pump main body 120, the first motor shaft 310a supporting the first hydraulic motor main body 320a in a relatively non-rotatable manner, and a first motor case 1400a accommodating the first hydraulic motor main body 320a.

The second hydraulic motor unit 1300b has substantially the same configuration as the first hydraulic motor unit 1300a. Therefore, in the drawing, the same reference characters as the first hydraulic motor unit 1300a with the suffix "b" in place of "a" are denoted for the second hydraulic motor unit 1300b, and the detailed explanations thereof are omitted.

The first motor case 1400a is provided with the pair of motor-side first hydraulic fluid passages 415a, as shown in FIG. 10.

The pair of motor-side first hydraulic fluid passages 415a has first ends fluidly connected to the first hydraulic motor main body 320a and second ends opened to the outer surface of the first motor case 1400a to form the pair of motor-side first hydraulic fluid ports 416a.

In the present embodiment, as shown in FIG. 10, one of the pair of pump-side hydraulic fluid ports 411 and one of the pair of motor-side first hydraulic fluid ports 416a are fluidly connected via a first hydraulic fluid conduit 401, the other of the pair of pump-side hydraulic fluid ports 411 and one of a pair of motor-side second hydraulic fluid ports 416b are fluidly connected via a second hydraulic fluid conduit 402, and the other of the pair of motor-side first hydraulic fluid ports 416a and the other of the pair of motor-side second hydraulic fluid ports 416b are fluidly connected via a third hydraulic fluid conduit 403.

Alternatively, it is possible that the pair of motor-side first hydraulic fluid ports 416a and the pair of motor-side second hydraulic fluid ports 416b are fluidly connected via a pair of motor-side hydraulic fluid conduits, one of the pair of pump-side hydraulic fluid ports 411 and one of the pair of motor-side hydraulic fluid conduits are fluidly connected via a pump-side first hydraulic fluid conduit, and the other of the pair of pump-side hydraulic fluid ports 411 and the other of the pair of motor-side hydraulic fluid conduits are fluidly connected via a pump-side second hydraulic fluid conduit.

Furthermore, it is possible that the hydraulic pump unit 1000 is provided with first and second hydraulic pump main bodies, the first hydraulic pump main body and the first hydraulic motor main body are fluidly connected via the pair of first hydraulic fluid lines, and the second hydraulic pump main body and the second hydraulic motor main body are fluidly connected via the pair of second hydraulic fluid lines.

The first motor case 1400a may be provided with a first hollow motor case main body, and a motor-side first port block detachably connected to the first motor case main body.

The motor-side first hydraulic fluid passages 415a are, for example, formed in the motor-side first port block.

The first motor case 1400a is provided with a first motor case oil-introducing port 1351a and a first motor case oil-discharging port 1352a that open the inner space of the first motor case 1400a outside. The first motor case oil-introducing port 1351a and the first motor case oil-discharging port 1352a are, for example, formed in the first motor case main body.

In the present embodiment, the first differential gear device 1500a is accommodated within the first motor case 1400a.

The first motor case 1400a further accommodates a reduction gear train 1550a interposed between the first hydraulic motor main body 320a and the first differential gear device 1500a.

As shown in FIG. 10, the working vehicle 1E according to the present invention further includes a circulation line 1440 and the oil cooler 700 interposed in the circulation line 1440.

The circulation line 1440 fluidly connects the auxiliary pump main body 510, the pump case 1200, the first motor case 1400a and the second motor case 1400b so that at least a part of the pressure oil, which has been discharged from the auxiliary pump main body 510, is passed through the inner spaces of the pump case 1200, the first motor case 1400a and the second motor case 1400b and then returned to the suction side of the auxiliary pump main body 510.

The oil cooler 700 is preferably interposed in the circulation line 1440 so as to be positioned at the discharge side of the auxiliary pump main body 510.

Specifically, as shown in FIG. 10, the circulation line 1440 includes the suction line 450; the discharge line 460; and a return line 1470 for returning the oil, which has been cooled by the oil cooler 700, to the external reservoir tank 550 through the pump case 1200, the first motor case 1400a and the second motor case 1400b.

In the present embodiment, the return line 1470 fluidly connects the first motor case 1400a, the second motor case 1400b and the pump case 1200 in series.

Specifically, the return line 1470 includes a first conduit 1471 having a first end fluidly connected to the oil cooler 700 and a second end fluidly connected to the first motor case oil-introducing port 1351a; a second conduit 1472 having a first end fluidly connected to the first motor case oil-discharging port 1352a and a second end fluidly connected to the second motor case oil-introducing port 1351b; a third conduit 1473 having a first end fluidly connected to the second motor case oil-discharging port 1352b and a second end fluidly connected to the pump case oil-introducing port 1201; and a fourth conduit 1474 having a first end fluidly connected to the pump case oil-discharging port 1202 and a second end fluidly connected to the external reservoir tank 550.

In the present embodiment, as described above, the return line 1470 fluidly connects the first motor case 1400a, the second motor case 1400b and the pump case 1200 in series. Alternatively to the configuration, it is, of course, possible that the first motor case 1400a, the second motor case 1400b and the pump case 1200 are fluidly connected to the oil cooler 700 in parallel.

It is also possible to bypass any of the first motor case 1400a, the second motor case 1400b and the pump case 1200 according to the specification.

The working vehicle according to the present embodiment further includes a bypass line 1600 having one end fluidly connected to the circulation line 1440, and a bypass valve 1650 for selectively fluidly communicating or shutting off the bypass line 1600, as shown in FIG. 10.

By providing the configuration, it is possible to have at least a part of the pressured oil in the circulation line 1440 flown out through the bypass line 1600 in a case where the oil pressure in the circulation line 1440 rises excessively. Accordingly, it is effectively prevented that the oil cooler 700, sealing members, conduits and the like that are interposed in the circulation line 1440 are damaged due to the oil pressure in the circulation line 1440.

In particular, the oil, which has been cooled by the oil cooler 700, tends to have a high viscosity. The above configuration could prevent the oil pressure in the circulation line 1400 from becoming excessively high even if the oil in the circulation line 1400 has a high viscosity.

Preferably, the other end of the bypass line 1600 is fluidly connected to the external reservoir tank 550.

The bypass valve 1650 is preferably a relief valve for setting a maximum pressure of the circulation line 1440.

By providing the configuration, the oil pressure in the circulation line 1440 could be prevented from being higher than the maximum pressure set by the relief valve.

It is, of course, possible to apply the bypass line 1600 and the bypass valve 1650 to the working vehicles according to the above embodiments 1-4.

Embodiment 6

Still another embodiment of the working vehicle according to the present invention will now be described with reference to the attached drawings.

Figure 11:
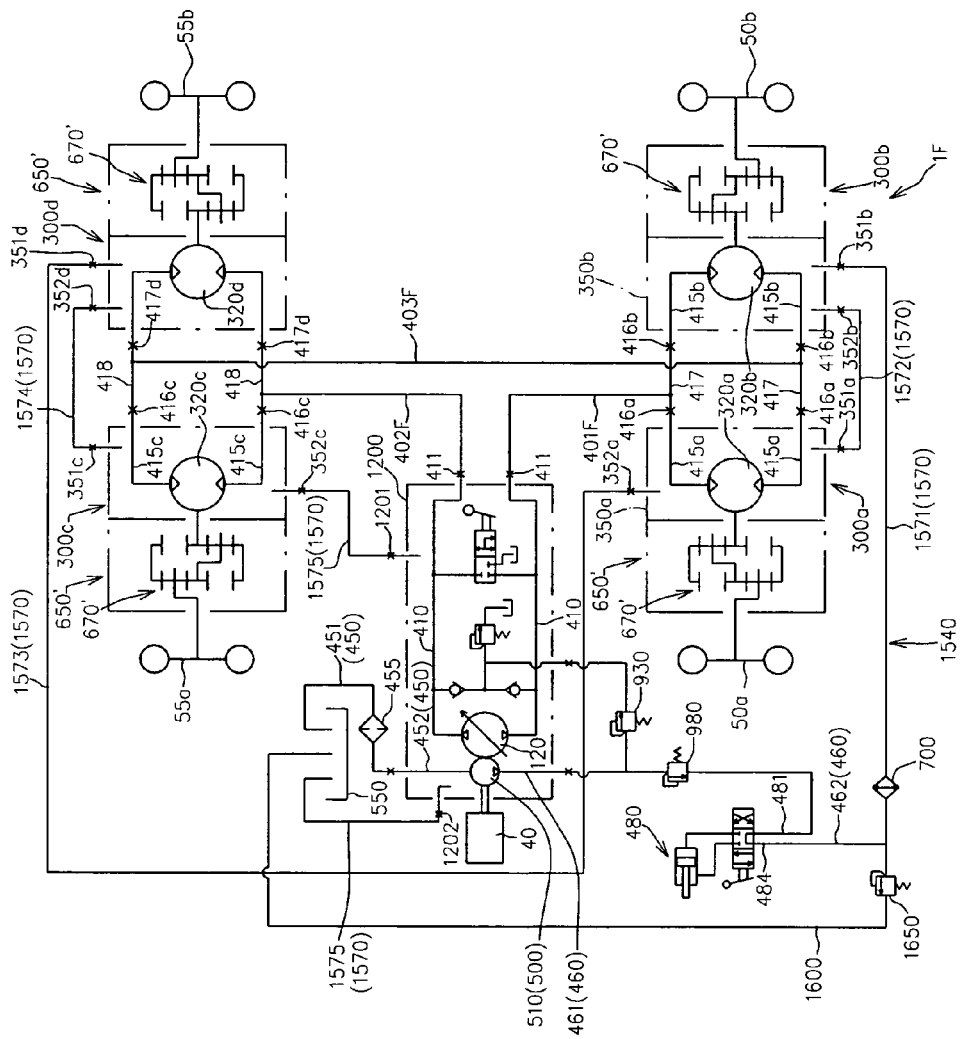
FIG. 11 is a hydraulic circuit diagram of a working vehicle according to a sixth embodiment of the present invention.

FIG. 11 shows a hydraulic circuit diagram of a working vehicle 1F according to the present embodiment.

In the figure, the same reference characters are denoted for the same members as in the above embodiments 1-5, and the detailed explanations thereof are omitted.

The working vehicle 1E according to the fifth embodiment is a four-wheel-drive working vehicle in which the first hydraulic motor main body 320a differentially drives the pair of first right and left driving wheels 50a, 50b via the first mechanical differential gear device 1500a, and the second hydraulic motor main body 320b differentially drives the pair of second right and left driving wheels 55a, 55b via the second mechanical differential gear device 1500b.

On the contrary, the working vehicle 1F according to the present embodiment is a four-wheel-drive working vehicle of a wheel motor type in which a hydraulic motor unit configuring a wheel motor device is provided for each of all driving wheels, as shown in FIG. 11.

Specifically, the working vehicle 1F includes the first and second hydraulic motor unit 300a, 300b operatively driving the pair of first right and left driving wheels 50a, 50b, respectively, and third and fourth hydraulic motor unit 300c, 300d operatively driving the pair of second right and left driving wheels 55a, 55b, respectively.

The second to fourth hydraulic motor units 300b-300d have substantially the same configuration as the first hydraulic motor unit 300a. Therefore, in the drawing, the same reference characters as the first hydraulic motor unit 300a with the suffix "b"-"d" in place of "a" are denoted for the second to fourth hydraulic motor units 300b-300d, respectively, and the detailed explanations thereof are omitted.

Each of the first to fourth hydraulic motor units 300a-300d configures a wheel motor device that drives a corresponding driving wheel with variable speeds, along with a cooperating reduction gear unit 650'.

In the present embodiment, the reduction gear unit 650' includes a pair of planetary gear trains 670' disposed in series.

The working vehicle 1F includes a pair of motor-side first hydraulic fluid conduits 417 fluidly connecting the pair of motor-side first hydraulic fluid ports 416a and the pair of motor-side second hydraulic fluid ports 416b; a pair of motor-side second hydraulic fluid conduits 418 fluidly connecting a pair of motor-side third hydraulic fluid ports 416c and a pair of motor-side fourth hydraulic fluid ports 416d; a first hydraulic fluid conduit 401F fluidly connecting one of the pair of pump-side hydraulic fluid ports 411 and one of the pair of motor-side first hydraulic fluid conduits 417; a second hydraulic fluid conduit 402F fluidly connecting the other of the pair of pump-side hydraulic fluid ports 411 and one of the pair of motor-side second hydraulic fluid conduits 418; a third hydraulic fluid conduit 403F fluidly connecting the other of the pair of motor-side first fluid conduits 417 and the other of the pair of motor-side second fluid conduits 418.

The working vehicle 1F further includes a circulation line 1540 and the oil cooler 700 interposed in the circulation line 1540.

The circulation line 1540 fluidly connects the auxiliary pump main body 510, the pump case 1200 and the first to fourth motor cases 350a-350d so that at least a part of the pressure oil, which has been discharged from the auxiliary pump main body 510, is passed through the inner spaces of the pump case 1200 and the first to fourth motor cases 350a-350d and then returned to the suction side of the auxiliary pump main body 510.

Specifically, the circulation line 1540 includes the suction line 450; the discharge line 460; and a return line 1570 for returning the oil, which has been cooled by the oil cooler 700, to the external reservoir tank 550 through the pump case 1200 and the first to fourth motor cases 350a-350d, as shown in FIG. 11.

In the present embodiment, the return line 1570 fluidly connects the first to fourth motor cases 350a-350d and the pump case 1200 in series.

Specifically, the return line 1570 includes a first conduit 1571 having a first end fluidly connected to the oil cooler 700 and a second end fluidly connected to the second motor case oil-introducing port 351b; a second conduit 1572 having a first end fluidly connected to the second motor case oil-discharging port 352b and a second end fluidly connected to the first motor case oil-introducing port 351a; a third conduit 1573 having a first end fluidly connected to the first motor case oil-discharging port 352a and a second end fluidly connected to a fourth motor case oil-introducing port 351d; a fourth conduit 1574 having a first end fluidly connected to a fourth motor case oil-discharging port 352d and a second end fluidly connected to a third motor case oil-introducing port 351c; a fifth conduit 1575 having a first end fluidly connected to a third motor case oil-discharging port 351d and a second end fluidly connected to the pump case oil-introducing port 1201; and a sixth conduit 1576 having a first end fluidly connected to the pump case oil-discharging port 1202 and a second end fluidly connected to the external reservoir tank 550.

Similarly to the above embodiments, in the working vehicle 1F as well, rise in temperature of the hydraulic pump main body 120 in the pump case 1200 and the hydraulic motor main bodies 320a-320d in the motor cases 350a-350d are effectively prevented, and thus worsening in the transmission efficiency of the traveling system HST configured by the hydraulic pump main body 120 and the hydraulic motor main bodies 320a-320d are effectively suppressed.

The working vehicle 1F further includes the bypass line 1600 and the bypass valve 1650. Accordingly, it is effectively prevented that the oil cooler 700, sealing members, conduits and the like that are interposed in the circulation line 1540 are damaged due to the oil pressure in the circulation line 1540.

Embodiment 7

Still another embodiment of the working vehicle according to the present invention will now be described with reference to the attached drawings.

Figure 12:
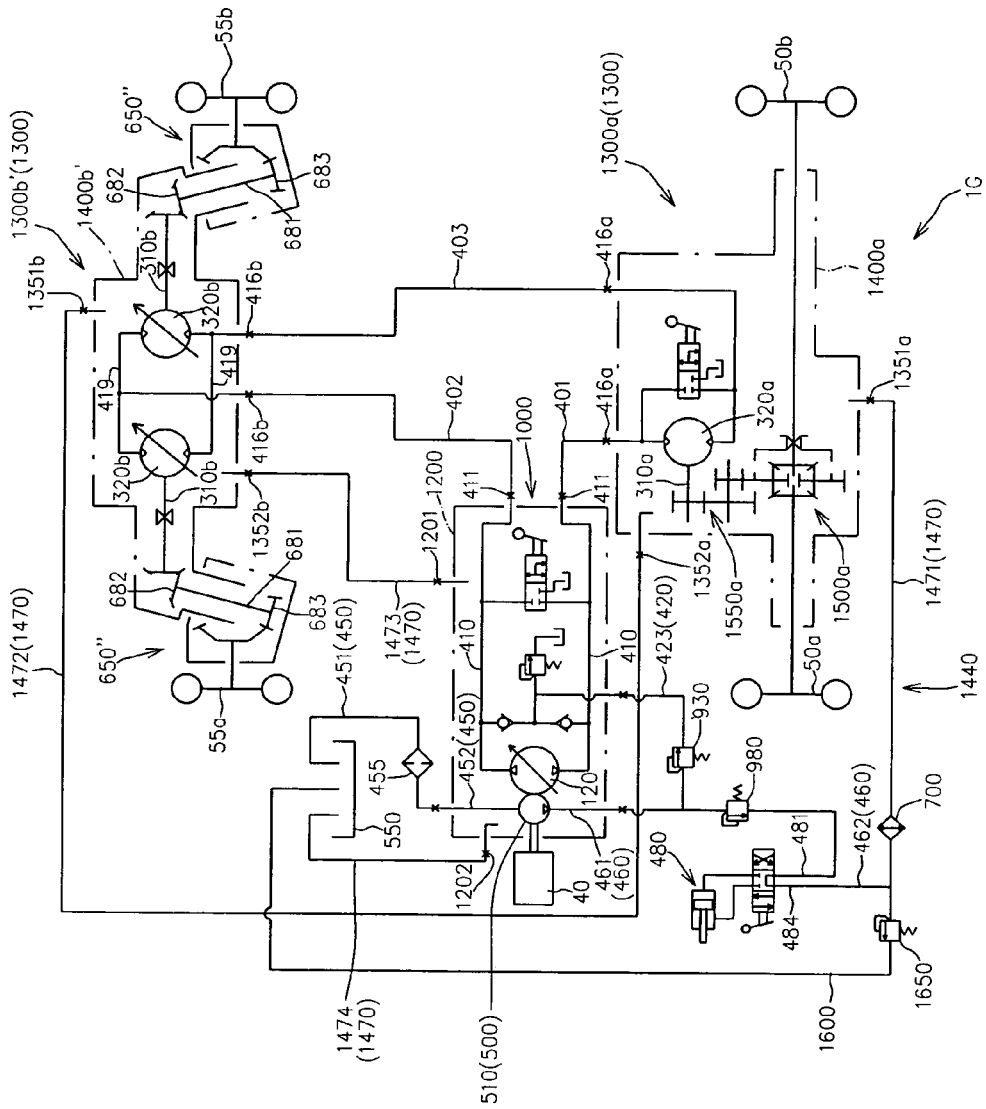
FIG. 12 is a hydraulic circuit diagram of a working vehicle according to a seventh embodiment of the present invention.

FIG. 12 shows a hydraulic circuit diagram of a working vehicle 1G according to the present embodiment.

In the figure, the same reference characters are denoted for the same members as in the above embodiments 1-6, and the detailed explanations thereof are omitted.

The working vehicle 1G according to the present embodiment is a four-wheel-drive working vehicle in which the pair of first right and left driving wheels 50a, 50b are differentially driven via the mechanical differential gear device 1500a, and the pair of second right and left driving wheels 55a, 55b are differentially driven via hydraulic action.

Specifically, the working vehicle 1G includes a second hydraulic motor unit 1300b' in place of the second hydraulic motor unit 1300b, in the working vehicle 1E according to the fifth embodiment.

The second hydraulic motor unit 1300b' includes a pair of the second hydraulic motor main bodies 320b that are fluidly connected to each other via a pair of motor-side hydraulic fluid lines 419 so as to form a closed circuit, and a second motor case 1400b' accommodating the pair of second hydraulic motor main bodies 320b.

In the present embodiment, as shown in FIG. 12, a pair of reduction gear unit 650" are further provided at both ends of the second hydraulic motor unit 1300b' in the vehicle width direction.

The reduction gear unit 650" includes a king pin shaft 681 extending along a substantially vertical direction; a first reduction bevel gear 682 provided at a upper end of the king pin shaft 681 in a relatively non-rotatable manner, the first reduction bevel gear 682 operatively connected to the corresponding second hydraulic motor main body 320b; and a second reduction bevel gear 683 provided at a lower end of the king pin shaft 681 in a relatively non-rotatable manner, the second reduction bevel gear 683 operatively connected to the corresponding second driving wheel 55a, 55b. The thus configured reduction gear unit 650" supports the corresponding second driving wheel 55a, 55b in a steerable manner around the king pin shaft 681.

The second motor case 1400b' is provided with the pair of motor-side second hydraulic fluid ports 416b that respectively open the pair of motor-side hydraulic fluid lines 419 outward, and the second motor case oil-introducing port 1351b and the second motor case oil-discharging port 1352b that open the inner space capable of storing the oil outward.

The working vehicle 1G is so configured that the pair of second driving wheels 55a, 55b are differentially driven by using a hydraulic action. In place of, or in addition to the configuration, the pair of first right and left driving wheels 50a, 50b could be differentially driven by using a hydraulic action.

This specification is by no means intended to restrict the present invention to the preferred embodiments set forth therein. Various modifications to the working vehicle may be made by those skilled in the art without departing from the spirit and scope of the present invention as defined in the appended claims.

What is claimed is:

1. A working vehicle comprising:
a hydraulic pump unit including a hydraulic pump main body operatively driven by a driving power source, and a pump case accommodating the hydraulic pump main body and having an inner space capable of storing oil;
a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil;
an auxiliary pump unit including an auxiliary pump main body operatively driven by the driving power source;
a circulation line for fluidly connecting the auxiliary pump main body, the pump case and the motor case so that at least a part of oil, which has been discharged from the auxiliary pump main body, returns to a suction side of the auxiliary pump main body through the inner spaces of the pump case and the motor case; and
an oil cooler interposed in the circulation line so as to be positioned between the auxiliary pump main body and the pump case or the motor case.

2. A working vehicle according to claim 1, further comprising:
an external reservoir tank forming an oil source for the auxiliary pump unit, wherein
the circulation line includes a suction line for fluidly connecting the external reservoir tank and the suction side of the auxiliary pump main body, a discharge line for fluidly connecting a discharge side of the auxiliary pump main body and the oil cooler, and a return line for returning the oil, which has been cooled by the oil cooler, to the external reservoir tank through the inner spaces of the pump case and the motor case.

3. A working vehicle according to claim 2, wherein the return line fluidly connect the pump case and the motor case in series.

4. A working vehicle according to claim 2, wherein the return line fluidly connect the pump case and the motor case in parallel.

5. A working vehicle according to claim 1, further comprising:
a bypass line having one end fluidly connected to the circulation line, and
a bypass valve for selectively communicating or shutting off the bypass line.

6. A working vehicle according to claim 5, wherein the bypass valve is a relief valve for setting a maximum pressure of the circulation line.

7. A working vehicle comprising:
a hydraulic pump unit including first and second hydraulic pump main bodies operatively driven by a driving power source, and a pump housing accommodating the first and second hydraulic pump main bodies and having an inner space capable of storing oil;
a first hydraulic motor unit spaced apart from the hydraulic pump unit so as to operatively drive a first driving wheel out of a pair of first and second driving wheels, the first hydraulic motor unit including a first hydraulic motor main body fluidly connected to the first hydraulic pump main body so as to form an HST in cooperation with the first hydraulic pump main body, and a first motor case accommodating the first hydraulic motor main body and having an inner space capable of storing oil;
a second hydraulic motor unit spaced apart from the hydraulic pump unit so as to operatively drive the second driving wheel, the second hydraulic motor unit including a second hydraulic motor main body fluidly connected to the second hydraulic pump main body so as to form an HST in cooperation with the second hydraulic pump main body, and a second motor case accommodating the second hydraulic motor main body and having an inner space capable of storing oil;
an auxiliary pump unit including an auxiliary pump main body operatively driven by the driving power source;
an external reservoir tank forming an oil source for the auxiliary pump unit;
a circulation line for fluidly connecting the external reservoir tank, the auxiliary pump main body, the pump housing and the motor case so that at least a part of oil, which has been suctioned by and discharged from the auxiliary pump main body, returns to the external reservoir tank through the inner spaces of the pump housing and the motor case; and
an oil cooler interposed in the circulation line so as to be positioned between the auxiliary pump main body and the pump housing or the motor case.

8. A working vehicle according to claim 7, wherein the pump housing includes a base housing having a single input portion operatively connected to the driving power source, output portions capable of outputting the rotational power of the input portion towards the first and second hydraulic motor main bodies, and an inner space capable of storing oil; and a pump case connected to the base housing, the pump case accommodating the first and second hydraulic pump main bodies and having an inner space of storing oil;
the base housing and the pump case are configured to be fluidly communicated to each other;
the pump case is provided with an oil-introducing port for receiving the oil directly or indirectly supplied from the auxiliary pump main body; and
the base housing is provided with an oil-discharging port for discharging the stored oil.

9. A working vehicle according to claim 8, wherein the pump case includes first and second pump cases accommodating the first and second hydraulic pump main bodies, respectively.

10. A working vehicle according to claim 8, further comprising:
a PTO clutch mechanism accommodated within the base housing in a state of being operatively connected to the driving power source; and
a PTO shaft operatively connected to a driven side of the PTO clutch mechanism and supported by the base housing so as to have a first end extending outward.

11. A working vehicle according to claim 10, wherein the oil-discharging port is arranged so as to overlap at least one part of the PTO clutch mechanism in front view, in a state where the base housing is mounted.

12. A working vehicle according to claim 10, wherein the oil-discharging port is arranged below the PTO shaft, in a state where the base housing is mounted.

13. A working vehicle comprising:
a hydraulic pump unit including a hydraulic pump main body operatively driven by a driving power source, and a pump case accommodating the hydraulic pump main body and having an inner space capable of storing oil;
a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil;

an auxiliary pump unit including an auxiliary pump main body operatively driven by the driving power source;

a circulation line for fluidly connecting the auxiliary pump main body and the motor case so that at least a part of oil, which has been discharged from the auxiliary pump main body, returns to a suction side of the auxiliary pump main body through the inner space of the pump case; and an oil cooler interposed in the circulation line so as to be positioned between the auxiliary pump main body and the motor case.

14. A working vehicle comprising:

a hydraulic pump unit including a hydraulic pump main body operatively driven by a driving power source, and a pump housing that has a pump case accommodating the hydraulic pump main body and a base housing connected to the pump case, the base housing accommodating a PTO clutch mechanism, which is operatively driven by the driving source, within an inner space capable of storing oil, and supporting a PTO shaft, which is operatively connected to a driven side of the PTO clutch mechanism, so as to have a first end extending outward;

a hydraulic motor unit spaced apart from the hydraulic pump unit so as to operatively drive a corresponding driving wheel, the hydraulic motor unit including a hydraulic motor main body fluidly connected to the hydraulic pump main body so as to form an HST in cooperation with the hydraulic pump main body, and a motor case accommodating the hydraulic motor main body and having an inner space capable of storing oil;

an auxiliary pump unit including an auxiliary pump main body operatively driven by the driving power source;

a circulation line for fluidly connecting the auxiliary pump main body, the base housing and the motor case so that at least a part of oil, which has been discharged from the auxiliary pump main body, returns to a suction side of the auxiliary pump main body through the inner spaces of the base housing and the motor case; and an oil cooler interposed in the circulation line so as to be positioned between the auxiliary pump main body and the base housing or the motor case.

15. A working vehicle comprising:

a hydraulic pump unit including a hydraulic pump main body operatively driven by a driving power source, and a pump housing accommodating the hydraulic pump main body and having an inner space capable of storing oil;

a first hydraulic motor unit spaced apart from the hydraulic pump unit and disposed at one side of the vehicle fore-and-aft direction so as to operatively drive a corresponding driving wheel, the first hydraulic motor unit including at least a first hydraulic motor main body fluidly connected to the hydraulic pump main body so as to form an HST in cooperation with the hydraulic pump main body, and at least a first motor case accommodating the first hydraulic motor main body and having an inner space capable of storing oil;

a second hydraulic motor unit spaced apart from the hydraulic pump unit and disposed at the other side of the vehicle fore-and-aft direction so as to operatively drive a corresponding driving wheel, the second hydraulic motor unit including at least a second hydraulic motor main body fluidly connected to the hydraulic pump main body so as to form an HST in cooperation with the hydraulic pump main body, and at least a second motor case accommodating the second hydraulic motor main body and having an inner space capable of storing oil;

an auxiliary pump unit including an auxiliary pump main body operatively driven by the driving power source;

a circulation line for fluidly connecting the auxiliary pump main body, the pump case and the first and second motor cases so that at least a part of oil, which has been discharged from the auxiliary pump main body, returns to a suction side of the auxiliary pump main body through the inner spaces of the pump case and the first and second motor cases; and an oil cooler interposed in the circulation line so as to be positioned at a discharge side of the auxiliary pump main body.

* * * * *